US009988058B2

(12) United States Patent
Phillips

(10) Patent No.: US 9,988,058 B2
(45) Date of Patent: Jun. 5, 2018

(54) METHOD AND SYSTEM FOR AUTOMATICALLY IDENTIFYING A DRIVER BY CREATING A UNIQUE DRIVER PROFILE FOR A VEHICLE FROM DRIVING HABITS

(71) Applicant: Brian K. Phillips, Jacksonville Beach, FL (US)

(72) Inventor: Brian K. Phillips, Jacksonville Beach, FL (US)

( * ) Notice: Subject to any disclaimer, the term of this patent is extended or adjusted under 35 U.S.C. 154(b) by 0 days. days.

(21) Appl. No.: 15/236,030

(22) Filed: Aug. 12, 2016

(65) Prior Publication Data

US 2016/0347325 A1 Dec. 1, 2016

Related U.S. Application Data

(62) Division of application No. 14/492,615, filed on Sep. 22, 2014, now Pat. No. 9,418,491.

(51) Int. Cl.
*G06C 5/00* (2006.01)
*G06F 7/00* (2006.01)
(Continued)

(52) U.S. Cl.
CPC ......... B60W 50/0098 (2013.01); G07C 5/008 (2013.01); G07C 5/02 (2013.01);
(Continued)

(58) Field of Classification Search
CPC ...... G07C 5/0808; G07C 5/008; G07C 5/085; G07C 5/02

USPC ........ 701/33, 517, 102, 31.4, 32.4, 36, 32.2, 701/115, 31.5; 705/4, 1.1, 400; 340/439; 455/418
See application file for complete search history.

(56) References Cited

U.S. PATENT DOCUMENTS 5,742,914 A * 4/1998 Hagenbuch ............ G01G 19/08
340/991
5,797,134 A * 8/1998 McMillan .......... G06Q 30/0283
705/4

(Continued)

OTHER PUBLICATIONS

Profile-based face recognition; I. A. Kakadiaris; H. Abdelmunim; W. Yang; T. Theoharis; Automatic Face & Gesture Recognition, 2008. FG '08. 8th IEEE International Conference on; Year: 2008; pp. 1-8, DOI: 10.1109/AFGR.2008.4813370.*

(Continued)

*Primary Examiner* — Cuong H Nguyen
(74) *Attorney, Agent, or Firm* — Lesavich High-Tech Law Group, S.C.; Stephen Lesavich

(57) ABSTRACT

A method and system for automatically creating a unique driver profile for a vehicle from driving habits. A unique driver profile is created with a portable on-board diagnostic series 2 (OBD-2) apparatus and/or linked and/or standalone network device (e.g., smart phone, tablet, wearable device, etc.). The unique driver profile is created from the accepted plural signals including time and geo-location data based on driving habits of the driver. The unique driver profile information is recorded on the apparatus and/or network device, downloaded at a later time or sent in real-time to check and verify an identity of the driver. The unique driver profile helps confirm an identity of the driver of the vehicle based on unique driving habits of the driver.

6 Claims, 11 Drawing Sheets

(51) Int. Cl.
| | |
|---|---|
| *B60W 50/00* | (2006.01) |
| *G07C 5/08* | (2006.01) |
| *G07C 5/00* | (2006.01) |
| *G07C 5/02* | (2006.01) |
| *G06Q 10/06* | (2012.01) |

(52) U.S. Cl.
CPC .......... *G07C 5/085* (2013.01); *G07C 5/0808* (2013.01); *B60W 2050/0083* (2013.01); *B60W 2050/0089* (2013.01); *B60W 2400/00* (2013.01); *B60W 2420/42* (2013.01); *B60W 2540/28* (2013.01); *B60W 2540/30* (2013.01); *G06Q 10/06* (2013.01); *G07C 2205/02* (2013.01)

(56) References Cited

U.S. PATENT DOCUMENTS

| | | | |
|---|---|---|---|
| 6,505,106 B1* | 1/2003 | Lawrence | G01M 15/05 342/357.31 |
| 6,529,723 B1* | 3/2003 | Bentley | B60R 25/1004 340/573.1 |
| 6,853,956 B2 | 2/2005 | Ballard, Jr. et al. | |
| 7,113,127 B1 | 9/2006 | Banet et al. | |
| 7,317,974 B2 | 1/2008 | Luskin | |
| 8,364,339 B2 | 1/2013 | Willard et al. | |
| 8,463,765 B2 | 6/2013 | Lesavich | |
| 8,558,678 B2 | 10/2013 | Van Wiemeersch et al. | |
| 8,587,420 B2* | 11/2013 | Koen | G08G 1/0104 340/438 |
| 8,670,897 B1* | 3/2014 | Ralson | G06F 11/3013 701/36 |
| 8,688,313 B2* | 4/2014 | Margol | G06F 8/61 701/31.4 |
| 8,744,642 B2 | 6/2014 | Nemat-Nasser et al. | |
| 9,037,564 B2* | 5/2015 | Lesavich | G06F 17/30864 707/706 |
| 9,094,800 B2 | 7/2015 | Ren | |
| 9,137,250 B2 | 9/2015 | Lesavich et al. | |
| 9,361,479 B2 | 6/2016 | Lesavich et al. | |
| 9,418,491 B2* | 8/2016 | Phillips | G07C 5/0808 |
| 9,569,771 B2 | 2/2017 | Lesavich et al. | |
| 2002/0049538 A1* | 4/2002 | Knapton | G01C 21/28 701/472 |
| 2004/0083041 A1 | 4/2004 | Skeen et al. | |
| 2004/0153362 A1 | 8/2004 | Bauer et al. | |
| 2005/0096809 A1* | 5/2005 | Skeen | G07C 5/008 701/31.4 |
| 2005/0131585 A1* | 6/2005 | Luskin | H04L 67/34 701/1 |
| 2005/0137757 A1 | 6/2005 | Phelan et al. | |
| 2006/0123053 A1 | 6/2006 | Scannell, Jr. | |
| 2006/0161315 A1 | 7/2006 | Lewis et al. | |
| 2008/0255722 A1 | 10/2008 | McClellan et al. | |
| 2010/0045451 A1 | 2/2010 | Periwal | |
| 2010/0210254 A1 | 8/2010 | Kelly et al. | |
| 2011/0106370 A1* | 5/2011 | Duddle | G06Q 40/08 701/31.4 |
| 2011/0112717 A1 | 5/2011 | Resner | |
| 2011/0208710 A1 | 8/2011 | Lesavich et al. | |
| 2011/0270486 A1 | 11/2011 | Stevens et al. | |
| 2012/0065834 A1* | 3/2012 | Senart | G07C 5/008 701/31.4 |
| 2012/0136623 A1 | 5/2012 | Edge | |
| 2012/0278622 A1 | 11/2012 | Lesavich et al. | |
| 2013/0246135 A1 | 9/2013 | Wang | |
| 2013/0268156 A1 | 10/2013 | Schumann et al. | |
| 2013/0344856 A1* | 12/2013 | Silver | H04M 1/72577 455/418 |
| 2014/0067195 A1 | 3/2014 | James et al. | |
| 2014/0106732 A1* | 4/2014 | Silver | H04M 1/72577 455/418 |
| 2014/0189792 A1 | 7/2014 | Lesavich et al. | |
| 2014/0195100 A1 | 7/2014 | Lundsgaard et al. | |
| 2014/0195102 A1* | 7/2014 | Nathanson | G07C 5/0808 701/31.4 |
| 2014/0324281 A1 | 10/2014 | Nemat-Nasser et al. | |
| 2014/0344420 A1 | 11/2014 | Rjeili | |
| 2014/0364153 A1 | 12/2014 | Ren | |
| 2015/0379301 A1 | 12/2015 | Lesavich et al. | |
| 2016/0086397 A1 | 3/2016 | Phillips | |
| 2016/0321654 A1 | 11/2016 | Lesavich et al. | |
| 2017/0091854 A1 | 3/2017 | Wang et al. | |

OTHER PUBLICATIONS

Road database design for velocity profile planning; O. Bauer; R. Mayr ; Control Applications, 2003. CCA 2003. Proceedings of 2003 IEEE Conference on; Year: 2003, vol. 2; pp. 1356-1361 vol. 2, DOI: 10.1109/CCA.2003.1223209.*

Extracting seafloor elevations from side-scan sonar imagery for SLAM data association Colin M. MacKenzie; Mae L. Seto; Yajun Pan 2015 IEEE 28th Canadian Conference on Electrical and Computer Engineering (CCECE); pp. 332-336, Year 2015.*

Predictive driving strategies under urban conditions for reducing fuel consumption based on vehicle environment information. Raubitschek, C.; Schutze, N.; Kozlov, E.; Baker, B.; Integrated and Sustainable Transportation system (FISTS), 2011 IEEE Forum on; Year: 2011; pp. 13-19, DOI: 10.1109/FISTS.2011.5973609.

Eco-routing: Comparing the fuel consumption of different routes between an origin and destination using field test speed profiles and synthetic speed profiles; Minett, C.F.; Salomons, A.M.; Daamen, W.; van Arem, B.; Kuijpers, S.; Integrated and Sustainable Transportation System (FISTS), 2011 IEEE Forum on ; Year: 2011; pp. 32-39, DOI: 10.1109.

Black boxes get green light [car crash data recorders]; W. D. Jones; IEEE Spectrum; Year: 2004, vol. 41, Issue: 12 pp. 14-16, DOI: 10.1109/MSPEC.2004.1363633.

GSM-based mobile tele-monitoring and management system for inter-cities public transportations; M. AL-Rousan; A. R. Al-Ali; K. Darwish; Industrial Technology, 2004. IEEE ICIT '04. 2004 IEEE International Conference on; Year: 2004, vol. 2 pp. 859-862 vol. 2, DOI: 10.1109/ICIT.2004.1490187.

Road database design for velocity profile planning; O. Bauer; R. Mayr ; Control Applications, 2003. CCA 2003. Proceedings of 2003 IEEE Conference on; Year: 2003, vol. 2; pp. 1356-1361 vol. 2, DOI: 10.1109/CCA.2003.1223209.

* cited by examiner

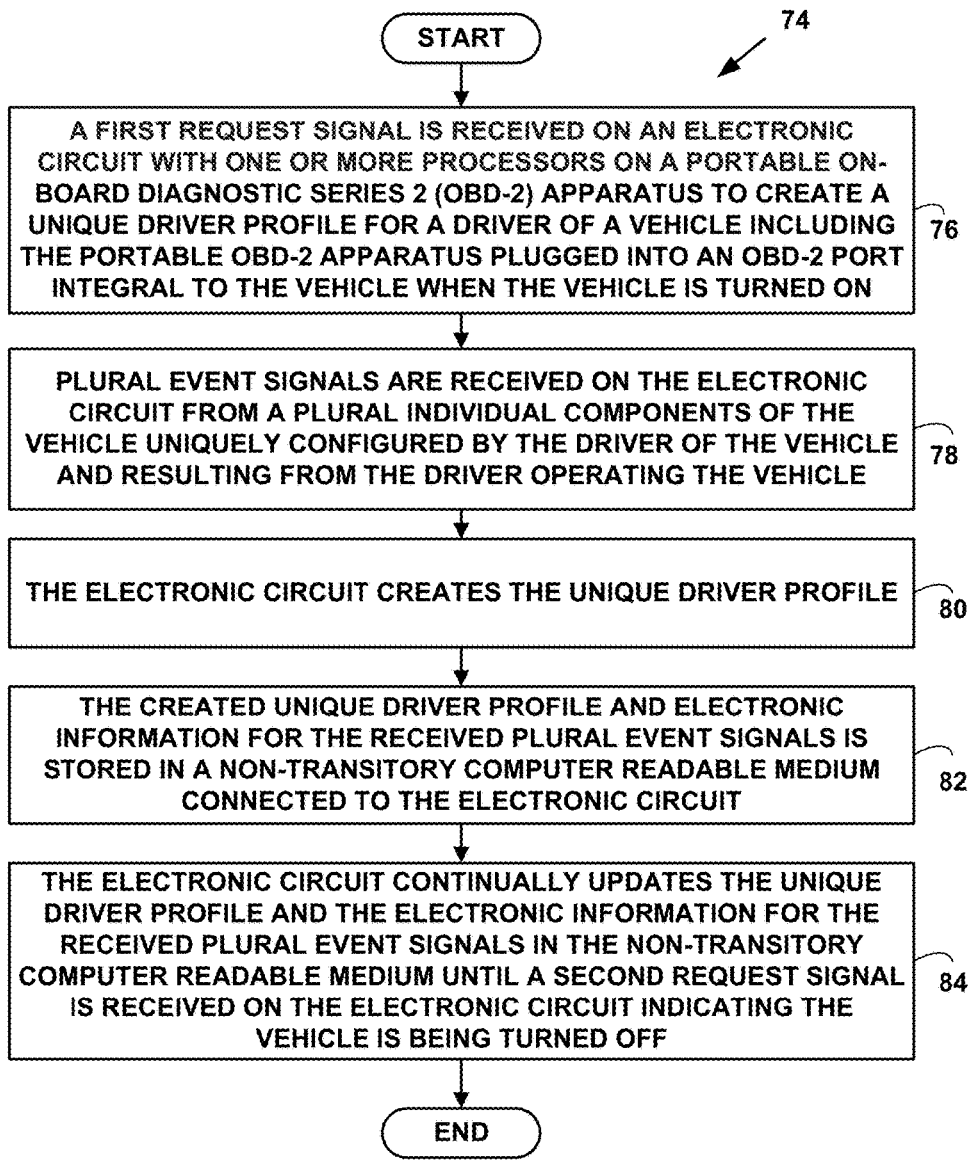

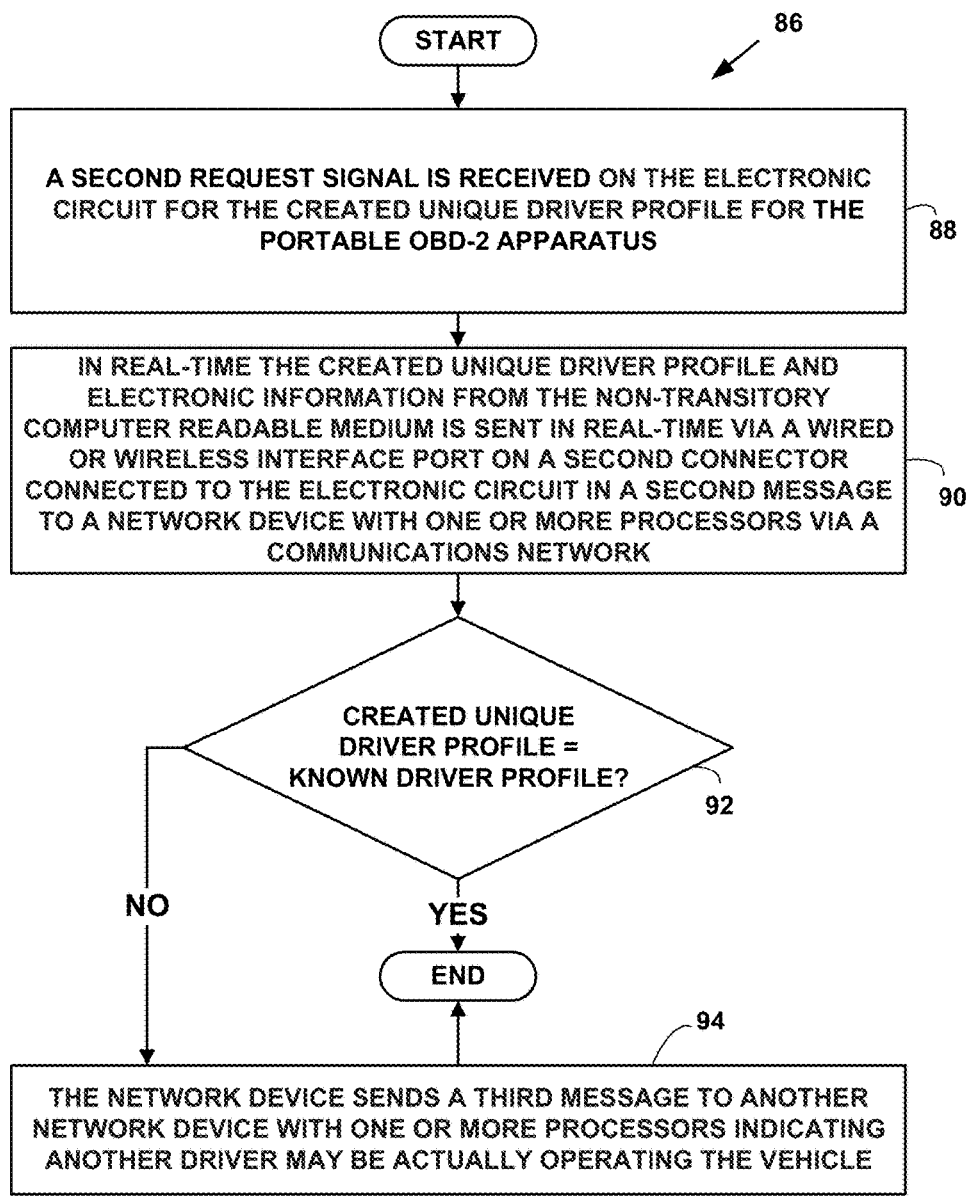

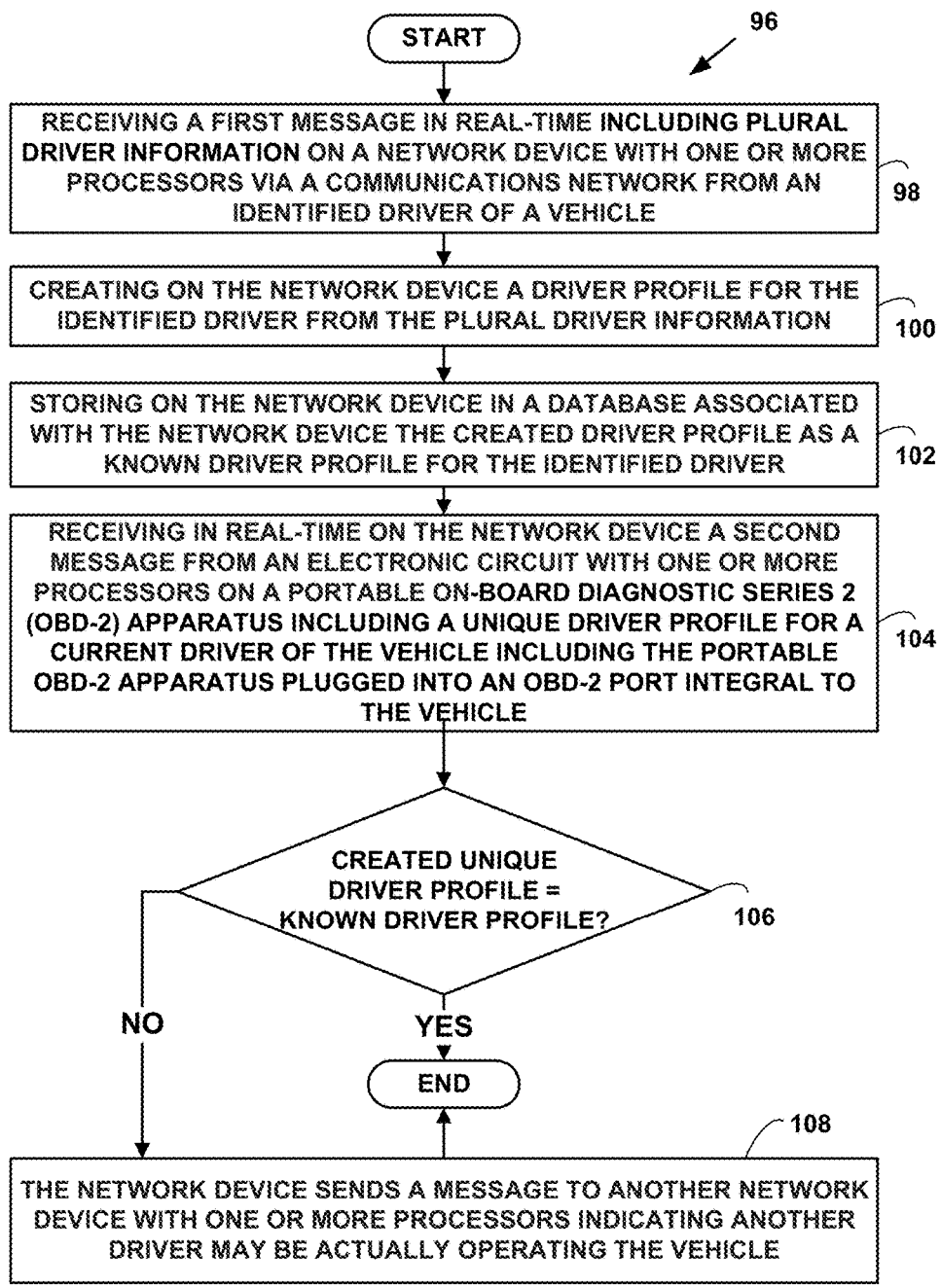

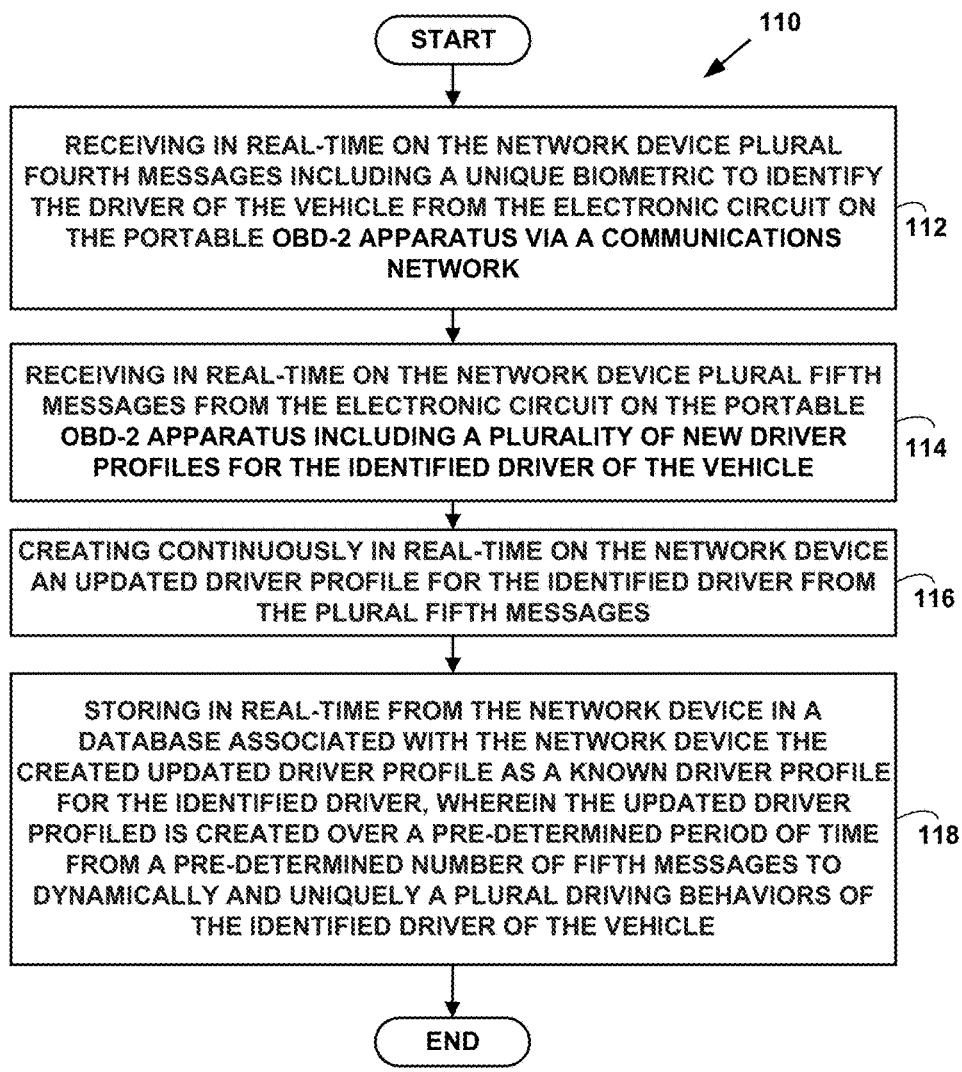

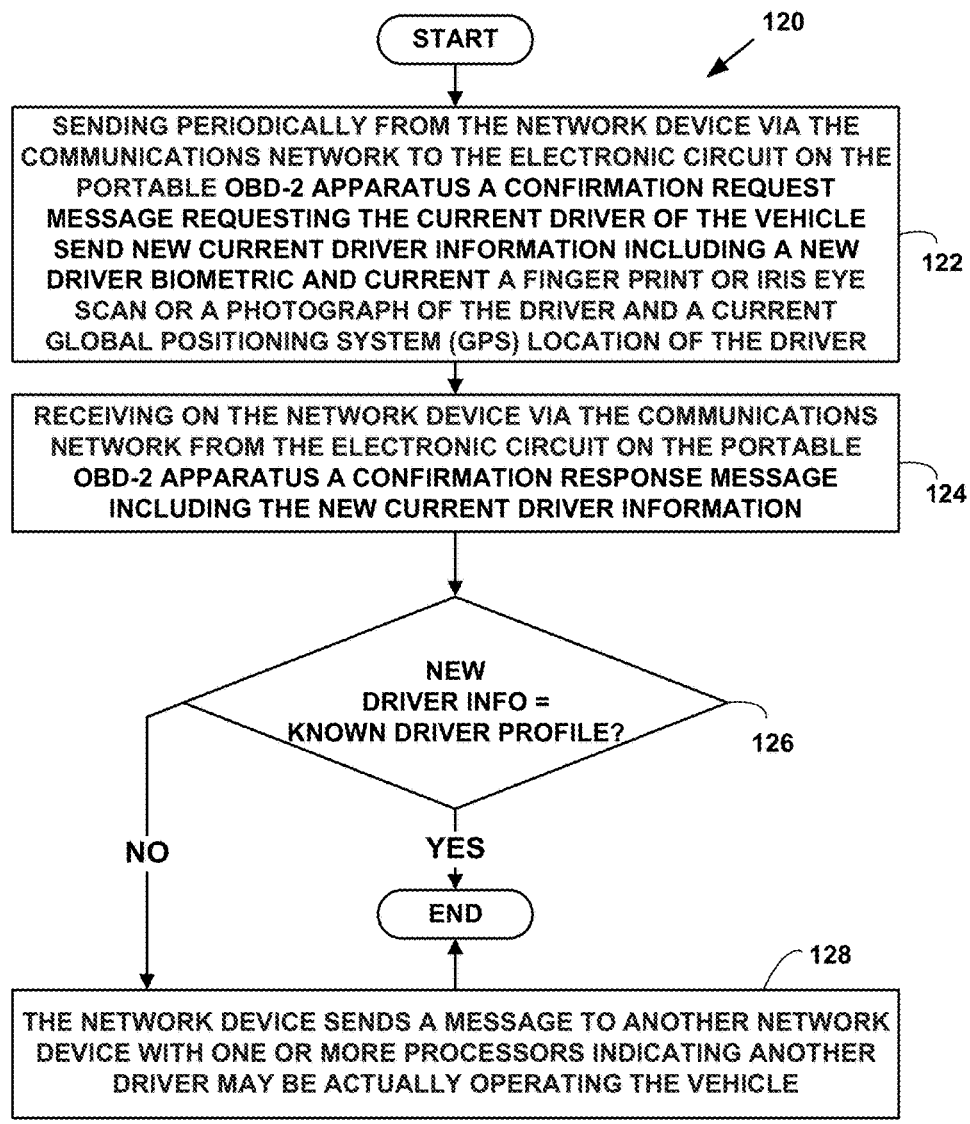

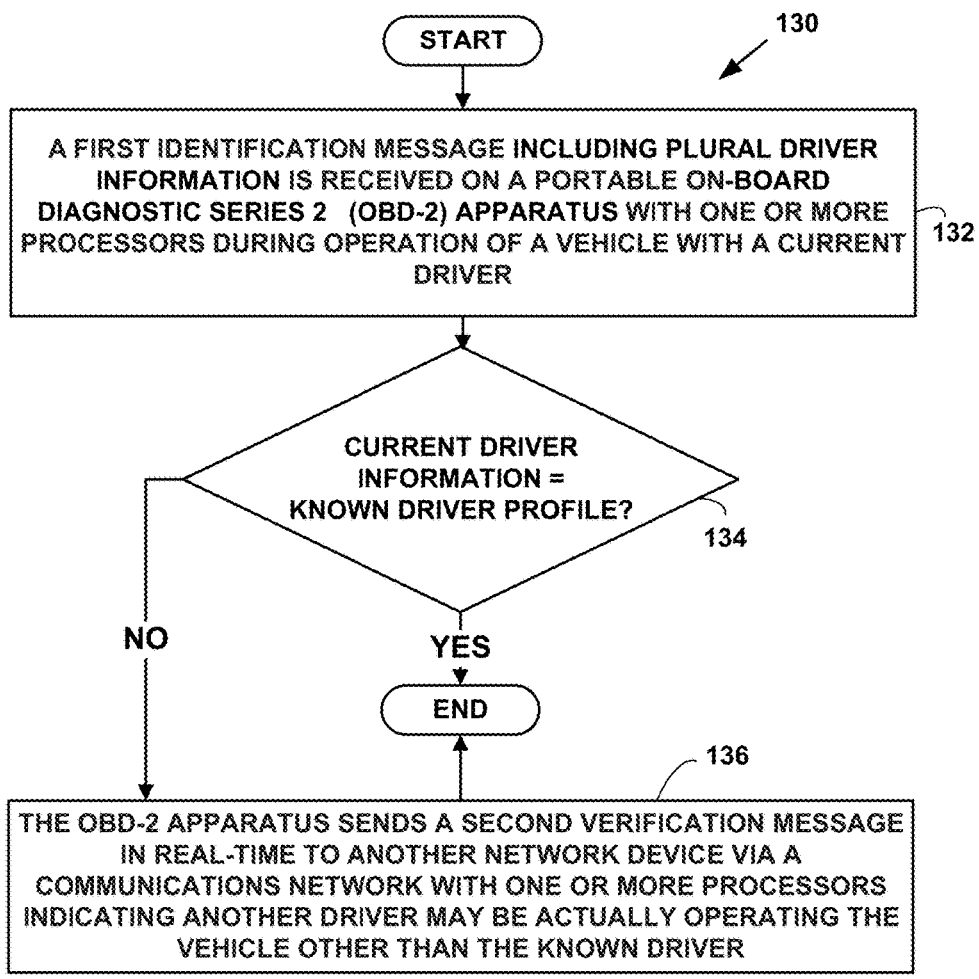

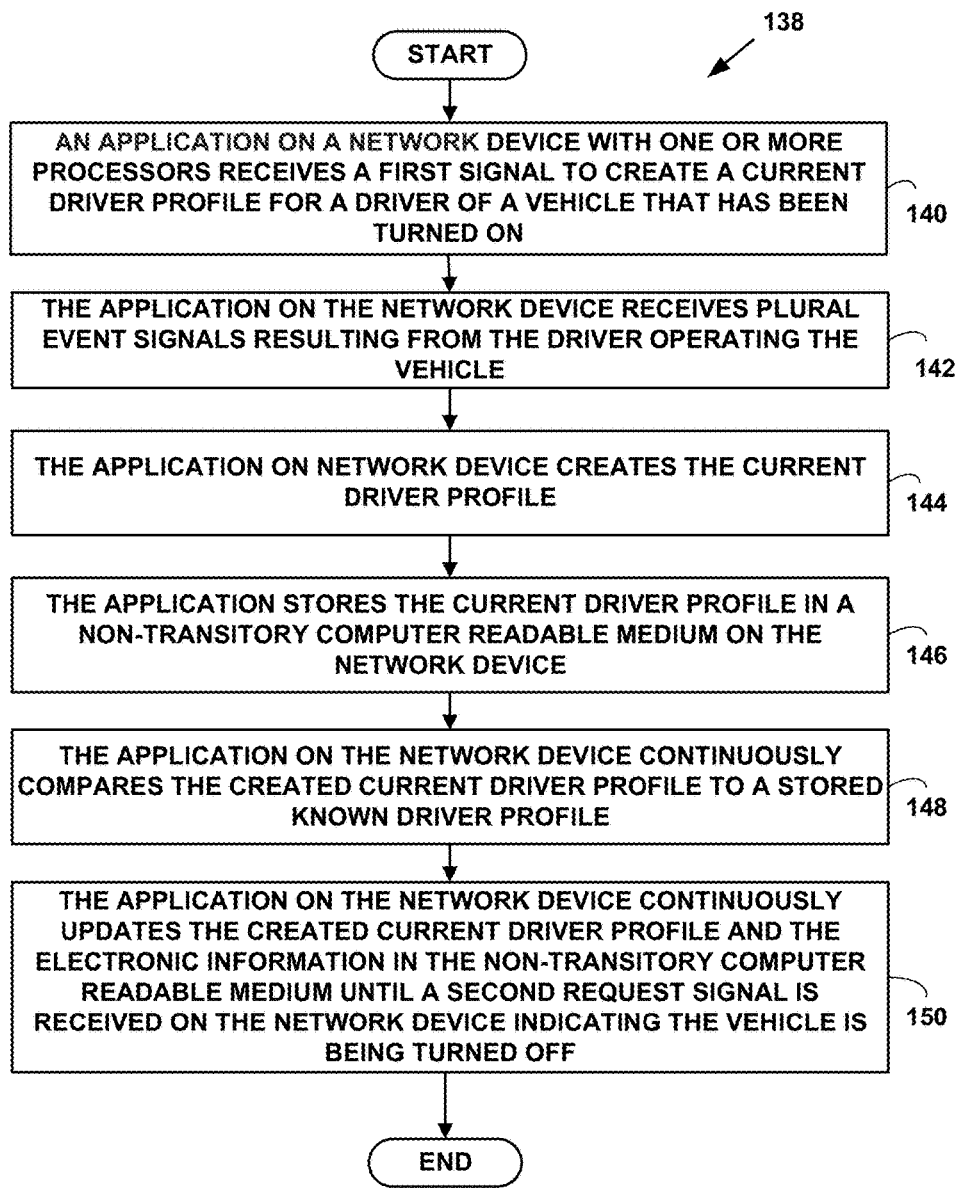

METHOD AND SYSTEM FOR AUTOMATICALLY IDENTIFYING A DRIVER BY CREATING A UNIQUE DRIVER PROFILE FOR A VEHICLE FROM DRIVING HABITS

CROSS REFERENCES TO RELATED APPLICATIONS

This application is filed as a result of a requirement for restriction and this application a DIVISIONAL of U.S. patent application Ser. No. 14/492,615, filed Sep. 22, 2014, that issued as U.S. Pat. No. 9,418,491, on Aug. 16, 2016, the contents of all of which are incorporated by reference.

FIELD OF INVENTION

This application relates to driver profiles. More specifically, it relates to a method and system for automatically creating a unique driver profile based on driving habits.

BACKGROUND OF THE INVENTION

"On-board diagnostics (OBD)" is a term referring to a vehicle's self-diagnostic and reporting capability. OBD systems give the vehicle owner or repair technician access to the status of the various vehicle sub-systems. The amount of diagnostic information available via OBD has varied widely since its introduction in the early 1980s' versions of on-board vehicle computers. Early versions of OBD would simply illuminate a malfunction indicator light if a problem was detected but would not provide any information as to the nature of the problem. Modern OBD implementations use a standardized digital communications port to provide real-time data in addition to a standardized series of diagnostic trouble codes (DTCs), which allow one to rapidly identify and remedy malfunctions within the vehicle.

OBD-1 was developed to encourage auto manufacturers to design reliable emission control systems that remain effective for the vehicle's "useful life". OBD 1.5 provided additional vehicle-specific diagnostic and control circuits via the connector. For example, there are OBD-1 interfaces for a Class 2 serial data stream from a Power Train Control Module (PCM), a Central Control Module (CCM) diagnostic terminal, a radio data stream, an airbag system, a selective ride control system, a low tire pressure warning system, and the passive keyless entry system, etc.

OBD-2 is an improvement over OBD-I in both capability and standardization. All cars manufactured after 1996 are required to have an OBD-2 port. The OBD-2 standard specifies the type of diagnostic connector and its pin locations, the electrical signaling protocols available, and the messaging format. It also provides a candidate list of vehicle parameters to monitor along with how to encode the data for each. There is a pin in the connector that provides power for the scan tool from the vehicle battery, which eliminates the need to connect a scan tool to a power source separately. However, some technicians might still connect the scan tool to an auxiliary power source to protect data in the unusual event that a vehicle experiences a loss of electrical power due to a malfunction. Finally, the OBD-2 standard provides an extensible list of DTCs. As a result of this standardization, a single device can query the on-board computer(s) in any vehicle.

This OBD-2 came in two models OBD-2A and OBD-2B. OBD-2 standardization was prompted by emissions requirements, and though only emission-related codes and data are required to be transmitted through it, most manufacturers have made the OBD-2 Data Link Connector (DLC) the only one in the vehicle through which all systems are diagnosed and programmed. OBD-2 Diagnostic Trouble Codes are 4-digit, preceded by a letter: P for engine and transmission (i.e., powertrain, etc.), B for body, C for chassis, U for network, etc.

OBD-2 ports and devices have also been used for safety purposes. Such devices are used to monitor driving habits, prevent phone use or texting during driving while intoxicated, etc.

OBD-2 devices are used for Usage-based insurance, also known as pay as you drive (PAYD) and pay how you drive (PHYD) and whereby the costs of motor insurance are dependent upon type of vehicle used, measured against time, distance, behavior and place.

A "habit" is an acquired behavior pattern regularly followed until it has becomes involuntary. Many drivers start driving at a very early age (e.g., 16, etc.) and develop regularly followed driving habits that are practiced each and every time they drive a vehicle. Such driving habits can be recorded within a vehicle from an OBD-2 device.

For example, using a small device that connects to a OBD-2 port, ESURANCE DRIVESENSE™ allows policyholders to track a variety of driving habits, from how much time they spend behind the wheel, to unsafe driving habits like speeding and sudden braking. Depending on how safely they drive, DRIVESENSE could save them money on their car insurance.

ESURANCE's teen program, ESURANCE DRIVE-SAFE® combines OBD-2 technology with a smartphone application to help limit phone use while driving. With the data gathered from a teen's car, parents get essential information about their driving in order to better coach them on specific habits.

The telecom provider SPRINT also offers an OBD-2 device that prevents a driver from texting and/or talking during driving. Other company's offer similar devices to track texting and/or talking behaviors.

OBD-2 are also used for vehicle tracking with Global Positioning System (GPS) and other (e.g., cellular telephone, wireless data, etc.) technologies. Such a GPS tracker that installs in the OBD-2 port of a vehicle and communicates the vehicle's location in real-time.

OBD-2 devices are also used to prevent drunk driving. For example, a Driver Alcohol Detection System for Safety (DADS S) includes "ignition interlock" systems. Such ignition systems require motorists with previous drunken-driving convictions to breathe into a blood-alcohol sensor to unlock the ignition to start the vehicle.

Other OBD-2 devices are used to assist parents of new drivers. An OBD-2 device either attach to a vehicles windscreen, like an add-on navigation system, or plug into the vehicle's OBD-2 port by the steering column under the dashboard. Using dedicated websites or smart phone applications, a maximum speed a car may be driven, geographical zones to be avoided ("geofencing") and any destinations that are specifically forbidden can be set. If the car is driven too fast, starts behaving erratically or breaks any of a set pre-defined rules, a driver gets a warning, and a text message or e-mail is sent to the new driver's parents.

There are a number of problems associated with using OBD-2 devices for monitoring drivers of vehicles. One problem is that OBD-2 devices do not collect information about the physical positions of seats, mirrors, etc. the driver may use. Another problem is that such OBD-2 devices do not collect and store a unique driver profile for the driver. Another problem is that such OBD-2 devices do not collect and store driver information as a result of the driver configuring and operating the vehicle. Thus, a driver with a suspended license could still operate the vehicle and if queried, indicate someone else was driving the vehicle.

The have been attempts to solve some of the problems with existing OBD-2 devices. For example, U.S. Pat. No. 5,797,134, that issued to McMillan et al. teaches "A method and system of determining a cost of automobile insurance based upon monitoring, recording and communicating data representative of operator and vehicle driving characteristics. The cost is adjustable retrospectively and can be prospectively set by relating the driving characteristics to predetermined safety standards. The method comprises steps of monitoring a plurality of raw data elements representative of an operating state of the vehicle or an action of the operator. Selected ones of the raw data elements are recorded when the ones are determined to have an identified relationship to safety standards. The selected ones are consolidated for processing against an insurer profile and for identifying a surcharge or discount to be applied to a base cost of automobile insurance. A final cost is produced from the base costs and the surcharges or discounts."

U.S. Pat. No. 6,529,723 that issued to Bentley teaches "The present invention provides an automated user notification system for monitoring user items and notifying a user when selected conditions occur. A first portion of the notification system comprises a network operations center (NOC). The NOC stores user information about one or more user items and is further coupled to a plurality of communication devices that can automatically contact a user. A second portion of the notification system comprises at least one detector. The detector monitors one or more user items and provides information regarding selected conditions of the user items to the NOC via a communication link. When the information is received by the NOC, the NOC automatically matches the received information to information stored at the NOC to determine if a condition exist wherein the user should be automatically notified."

U.S. Pat. No. 6,853,956 that issued to Ballard et al. teaches "A sobriety interlock system having an alcohol detection device electrically connected to a computing device is provided. An electronic circuit is electrically connected between the computing device and an OBD-II port on a machine for receiving data related to operation of the machine. A breath sample is provided by an operator of the machine and the alcohol detection device determines the alcohol concentration of the breath sample. The computing device determines a blood alcohol concentration for the operator based on the breath alcohol concentration, and the computing device prevents or allows operation of the machine based on the level of the blood alcohol concentration. A memory device stores machine operation data received through the OBD-II port."

U.S. Pat. No. 7,113,127 that issued to Banet et al. teaches "Embodiments of the present invention provide a wireless appliance for monitoring a vehicle. The wireless appliance includes a microprocessor configured to select a vehicle-communication protocol of a host vehicle, and then communicate with the host vehicle through the vehicle-communication protocol. The appliance also includes a vehicle-communication circuit, in electrical communication with the microprocessor, which collects diagnostic data from the host vehicle using the vehicle-communication protocol. A GPS module, also in electrical communication with the microprocessor, generates location-based data. For transmitting these data, the appliance includes a first wireless transmitter operating on a terrestrial network and a second wireless transmitter operating on a satellite network. The microprocessor selects the first or second wireless transmitter for transmitting the diagnostic and location-based data."

U.S. Pat. No. 8,558,678 that issued to Van Wiemeersch et al. teaches "Various embodiments may include detecting an unauthorized use of a vehicle in the absence of GPS location information. Vehicle component condition data may be received for one or more vehicle components. Historical vehicle component condition data for the one or more vehicle components may also be received. A comparison between the vehicle component condition data and the historical vehicle component condition data may be performed in order to determine if an inconsistency exists between the vehicle component condition data and the historical vehicle component condition data based on the comparison. Upon determining the inconsistency, an alert signal signifying an unauthorized use may be generated. At least one of the vehicle component condition data and the alert signal may be transmitted to a remote terminal to alert a user of the unauthorized use."

U.S. Pat. No. 8,587,420 that issued to Koen teaches "Data flow from a vehicle telematics device to a remote host, rationalized regardless of the source of the data and its format. Disclosed is a method to unify and process data from multiple sources into singular information for use within the telematics device for vehicle usage data, driver performance, and location data."

U.S. Pat. No. 8,670,897 that issued to Ralson teaches "An in-vehicle mobile communication and routing apparatus for use with a taxi cab, public safety vehicle, delivery truck, fire truck, emergency vehicle, or any vehicle. Embodiments of the invention include a system incorporating the apparatus and a method for using the same. The mobile apparatus is attachable to a vehicle and includes a plurality of long-range transceivers communicatively coupled with one or more databases located remotely from the vehicle, and a plurality of short-range transceivers communicatively coupled with one or more devices external to the mobile apparatus and proximally located to the vehicle. An intelligent power supply is structured to monitor a battery condition of the vehicle and initiate a controlled shutdown of the mobile apparatus responsive to at least one of a timer countdown and a voltage threshold of a vehicle battery. Devices external to the mobile apparatus communicate with an in-vehicle processor and one or more remote databases."

U.S. Pat. No. 8,688,313 that issued to Margol et al. teaches "A system and method for remotely programming a vehicle including a vehicle connector with a plurality of pins in communication with one or more vehicle sub-systems or modules, a vehicle communication device connected to the vehicle connector; a bi-directional communication link between the vehicle communication device and a remote communication device, and a computer system connected to the remote communication device. The vehicle communication device is configured to receive signals from the pins, convert the signals to a network compatible data packet which can then be transmitted to the remote communication device, which re-coverts the signals to the pin signals, which can be read by a computing system, such as a vehicle scan tool. Programming instructions can be sent from the scan tool to the vehicle, over the bi-directional communication link between the remote communication device and the vehicle communication device."

U.S. Pat. No. 8,744,678 that issued to Becher et al. teaches "An apparatus that restricts or disables electronic device functionality based on vehicle status data received from the on-board computer ("OBD") of a public service vehicle. In some embodiments, the vehicle status data is accessed from the OBD through an assembly line diagnostic link ("ALDL") connector, which eliminates any need for modification of the vehicle during installation. If the software determines the vehicle status data is outside a preset range, which could be customized on a case-by-case basis, the on-board computer of the vehicle could be restricted or disabled until the vehicle status data returns to within the preset range."

However, none of these solutions solve all of the problems associated with creating unique driver profiles. Thus, it is desirable to solve some of the problems associated with automatically creating unique driver profiles including habits of drivers.

SUMMARY OF THE INVENTION

In accordance with preferred embodiments of the present invention, some of the problems associated with creating unique driver profiles are overcome. A method and system for automatically creating a unique driver profile for a vehicle from driving habits is presented.

A unique driver profile is created with a portable on-board diagnostic series 2 (OBD-2) apparatus and/or linked and/or standalone network device (e.g., smart phone, tablet, wearable device, etc.). The apparatus is configured for accepting plural electronic signals from plural individual components of the vehicle uniquely configured by the driver of the vehicle along with inputs from a GPS system or device and from the result of the driver operating the vehicle. The unique driver profile is created from the accepted plural signals including time and geo-location data based on driving habits of the driver. The unique driver profile information is recorded on the apparatus and/or network device and downloaded at a later time or sent in real-time from the apparatus to a network device to check and verify an identity of the driver. The unique driver profile helps confirm an identity of the driver of the vehicle based on unique driving habits of the driver.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 6 is a flow diagram illustrating a method for a method for creating a unique driver profile for a vehicle;

FIG. 7 is a flow diagram illustrating a method for creating a unique driver profile for a vehicle;

FIG. 8 is a flow diagram illustrating a method for creating a unique driver profile for a vehicle;

FIG. 9 is a flow diagram illustrating a method for a method for creating a unique driver profile for a vehicle;

FIG. 10 is a flow diagram illustrating a method for a method for creating a unique driver profile for a vehicle;

FIG. 11 is a flow diagram illustrating a method for a method for creating a unique driver profile for a vehicle; and FIG. 12 is a flow diagram illustrating a method for a method for creating a unique driver profile for a vehicle.

DETAILED DESCRIPTION OF PREFERRED EMBODIMENTS

Figure 1:
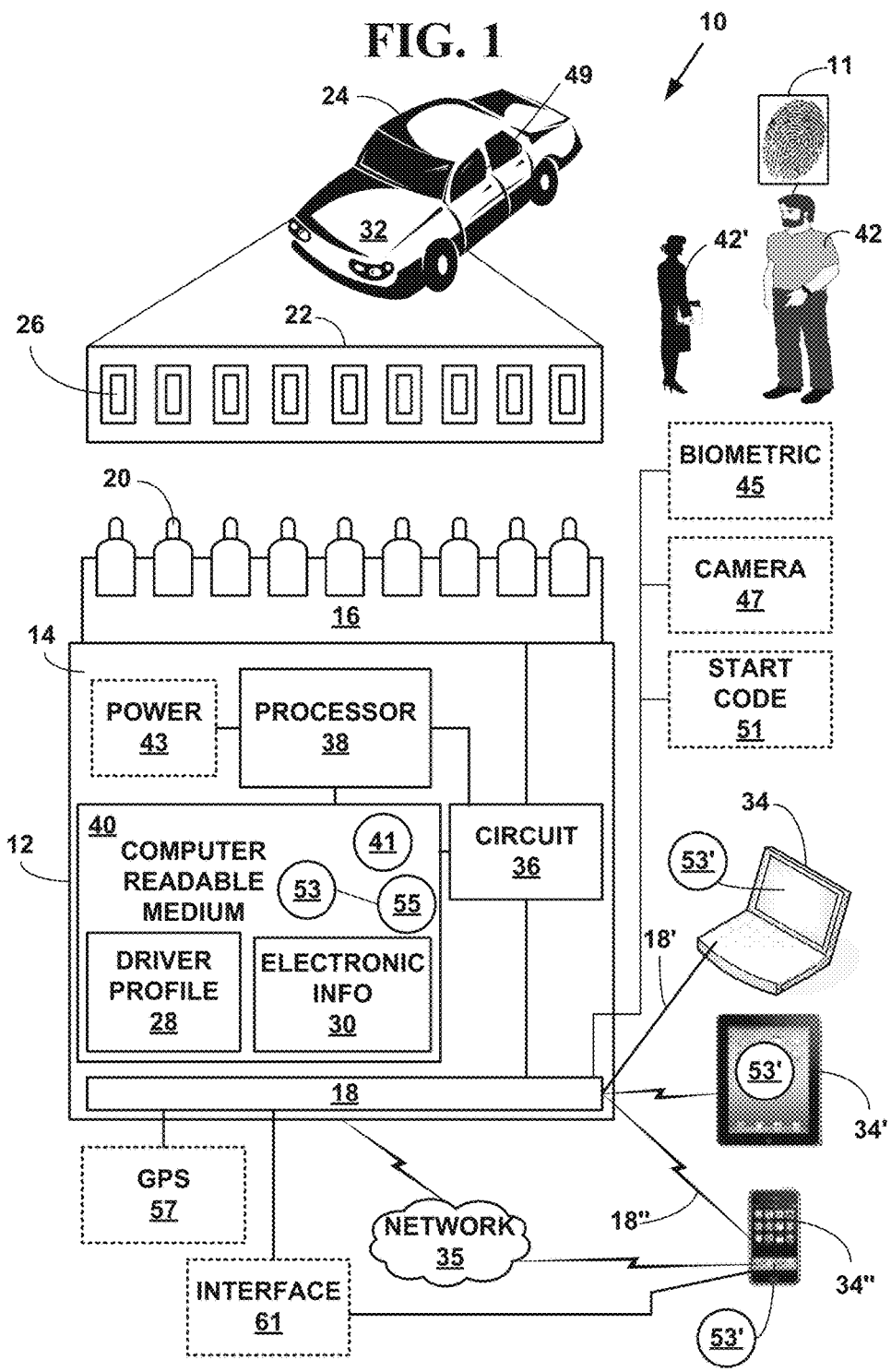
FIG. 1 is a block diagram illustrating a portable on-board diagnostic (OBD) apparatus.

Identification of a Driver by Driving Habits

A "habit" is a routine of behavior that is repeated regularly and tends to occur unconsciously. The American Journal of Psychology in 1903, stated, "a habit, from the standpoint of psychology, is a more or less fixed way of thinking, willing, or feeling acquired through previous repetition of a mental experience." Habitual behavior often goes unnoticed in persons exhibiting it, because a person does not need to engage in self-analysis when undertaking routine tasks such as driving. Habits are sometimes compulsory. The process by which new behaviors become automatic is habit formation. Old habits are hard to break and new habits are hard to form because the behavioral patterns we repeat are imprinted in our neural pathways and do not change frequently.

As behaviors are repeated in a consistent context, there is an increase in the link between the context and the action. This increases the automaticity of the behavior in that context. Features of an automatic behavior are all or some of: efficiency, lack of awareness, un-intentionality, uncontrollability.

"Habit formation" is thus a process by which a behavior, through regular repetition, becomes automatic. A driving habit thus becomes an acquired behavior pattern regularly followed until it has becomes involuntary. Since most drivers in the United States start driving at a very early age, such as age 15 or 16, a 30 year old driver will operate a vehicle with involuntary driving habits practiced repeatedly (e.g., daily, etc.) over a period of 15 years.

"Habit evidence" is a term used in the law of evidence in the United States to describe any evidence submitted for the purpose of proving that a person acted in a particular way on a particular occasion based on that person's tendency to reflexively respond to a particular situation in a particular way and without voluntary thought. Habit evidence includes habit evidence for a driver driving a vehicle.

Additional information about using habits can be found in the book, "*The Power of Habit: Why We Do What We Do in Life and Business*," by Charles Duhigg, Random House, 2014, ISBN-978-0812981605, the contents of which are incorporated by reference.

In the present invention, it has been determined experimentally by examining a number of data sets that a driver of a vehicle can be identified with a very high level of accuracy (e.g., 95% or more, etc.) based on the unique "driving habits" of the driver. The driver habits include adjustments to seats, mirrors, heating/cooling preferences, radio preferences, etc., smoking or not smoking, in a passenger compartment of a vehicle, driving characteristics such as acceleration curves, de-acceleration curves, braking, driving speeds, fuel consumption, rpm data, etc., driving routes including GPS time and location data, days of the week of driving activities, time of day of driving activities, etc. The habits of a driver of a vehicle are collected and stored with an on-board diagnostics (OBD) apparatus and/or in association with a smart phone and/or tablet, etc. to positively identify and verify the driver of the vehicle.

Since driving habits are behavior that through regular repetition becomes automatic, they can be used to identify and verify an identity of a driver of vehicle.

Exemplary Portable on-Board Diagnostic (OBD) Apparatus

In an exemplary embodiment, a driver's driver habits are captured with a portable vehicle on-board diagnostics (OBD) apparatus. The OBD is used alone or in association with another device such as a smart phone, tablet, etc.

FIG. 1 is a block diagram 10 illustrating a portable vehicle on-board diagnostics (OBD) apparatus 12. The apparatus 12 comprises a case component 14, including a first side comprising a male connector 16 and a second side of the case component including a second connector 18. The male connector 16 includes plural pins 20 for connecting to a female on-board diagnostic series 2 (OBD-2) port 22 integral to a vehicle 24 with plural electronic receptacles 26 for receiving the plural pins 20 from the male connector 16. The shape of the male connector 16 in the drawing in FIG. 1 is exemplary only and for simplicity and does not all sixteen pins required for an OBD-2 connector. The female OBD-2 port 22 also does not include all sixteen receptacles 26 required for an OBD-2 receptacle. See FIG. 2 for a more accurate drawing of the apparatus 12 shape. The second connector 18 includes a second type of interface for securely providing a unique driver profile 28 and electronic information 30 from plural electronic signals from plural individual components 32 (e.g., mirrors, seats, brakes, accelerator, heating/cooling, etc.) of the vehicle 24 to an external device 34, 34', 34", only three of which are illustrated, each with one or more processors. The apparatus 12 further includes an electronic circuit 36 including one or more processors 38 inside the case component 14 connected to the male connector 18, the second connector 18 and a non-transitory computer readable medium 40. The electronic circuit 36 is configured for automatically creating the unique driver profile 28 for a driver 42 of the vehicle 24 from the electronic information 30 received from the plural electronic signals including time and geo-location data from the plural individual components 32 of the vehicle and on onboard Global Positioning System (GPS) and clock 24 configured by the driver 42 of the vehicle 24 and received as a result of the driver 42 operating the vehicle 24 and stored in the non-transitory computer readable medium 40. The non-transitory computer readable medium 40 connected to the electronic circuit 36 is used for the storing the created unique driver profile 28 and for storing the electronic information 30 received from the plural electronic signals from the plural individual components 32 of the vehicle 24 uniquely configured by the driver 42 of the vehicle 24 and received as the result of the driver 42 operating the vehicle 24. The created unique driver profile 28 includes unique driving habits of the driver 42 and is used to positively identify the driver 24 (or another driver 42', etc.) when the driver drives the vehicle 42.

However, the present invention is no limited to these components, and more, fewer or other components can be used to practice the invention.

The apparatus 12 is used to collect habitual driving information about the driver 42 of the vehicle 24. The habitual driving information is used to positively identify and verify the driver 42 of the vehicle 24 is actually driving the vehicle 24 based on the driver' 42 driving habits.

The apparatus 12 is described with an exemplary embodiment. However, the invention is not limited to this exemplary embodiment and other embodiments can be used to practice the invention.

In such an exemplary embodiment, the case component 14 includes plastic, rubber, wood, metal, paper, composite materials and/or other types of materials to provide a durable case.

The plastic materials include Polyetherimide, Polyimide other thermosetting polyimides, Polyvinyl chloride (PVC) polyethylene, polypropylene, and/or other plastics. However, the present invention is not limited to these materials and other materials can be used to practice the invention.

"Polyetherimide" (PEI) is an amorphous, amber-to-transparent thermoplastic with characteristics similar to the related plastic PEEK. Polyether ether ketone (PEEK) is a colorless organic polymer thermoplastic Relative to PEEK, PEI is cheaper, but less temperature-resistant and lower in impact strength.

For example, commercially, ULTEM is a family of PEI products manufactured by SABIC. ULTEM resins are used in medical and chemical instrumentation due to their heat resistance, solvent resistance and flame resistance.

"Polyimide" (PI) is a polymer of imide monomers. Such imide monomers include pyromellitic dianhydride and 4,4'-oxydianiline and others. Polyimide materials are light-weight, flexible, resistant to heat and chemicals. Polyimide parts are not affected by commonly used solvents and oils, including hydrocarbons, esters, ethers, alcohols and freons. They also resist weak acids.

"Thermosetting polyimides" are known for thermal stability, good chemical resistance, excellent mechanical properties. Normal operating temperatures for such polymides range from cryogenic with temperatures below about −238° F. (−150° C.) to those exceeding about 500° F. (260° C.).

"Composite materials" are engineered or naturally occurring materials made from two or more constituent materials with significantly different physical or chemical properties which remain separate and distinct at the macroscopic or microscopic scale within the finished structure. Common polymer-based composite materials, include at least two parts, a substrate (e.g., fibers, etc.) and a resin.

The composite materials include "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

However, the present invention is not limited to these materials and other materials can be used to practice the invention.

Figure 2:
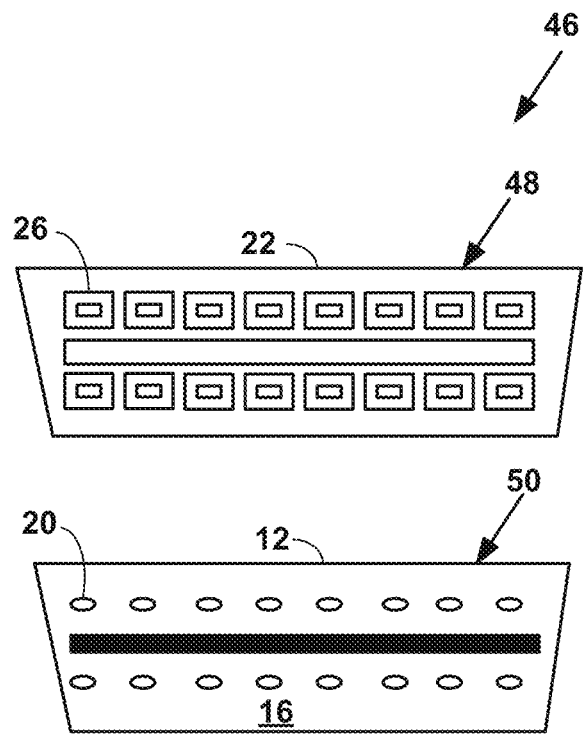
FIG. 2 is a block diagram 46 illustrating a front view of the portable OBD apparatus of FIG. 1.

FIG. 2 is a block diagram 46 illustrating a front view 48 of the portable OBD apparatus 12 of FIG. 1. The front view 46 illustrates a front view 48 of the OBD-2 port 22 integral to the vehicle 24 with plural electronic receptacles 26. The front view 48 also illustrates a front view 50 the male connector 18 with the plural pins 20.

Figure 3:
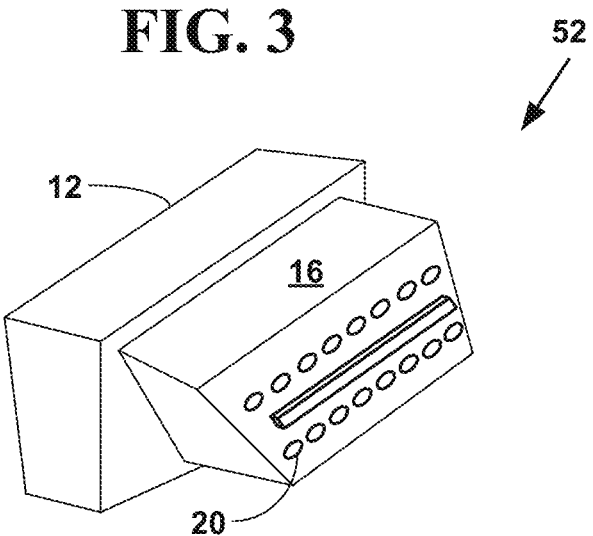
FIG. 3 is a block diagram illustrating a perspective view of the portable OBD apparatus of FIG. 1.

FIG. 3 is a block diagram illustrating a perspective view 52 of the portable OBD apparatus 12 of FIG. 1. The size and shape are exemplary only. Other sizes and shapes can be used to practice the invention and the present invention is not limited to the size and shape illustrated in FIG. 3.

The male connector 16 includes plural pins 20 for connecting to the female on-board diagnostic series 2 (OBD-2) port 22 integral to the vehicle 24 with plural electronic receptacles 26 for receiving the plural pins 20 from the male connector 18. However, the present invention is not limited to this embodiment and other series of on-board diagnostics (e.g., series, 3, 4, etc.) can be used to practice the invention.

In one embodiment, the male connector 18 includes a male 16-pin (2×8) J1962 connector (e.g., illustrated with front view 50 of FIG. 3). However, the present invention is not limited to such a connector and other connectors can be used to practice the invention.

The OBD-2 standard specifies the type of diagnostic connector and its pinout, the electrical signaling protocols available, and the messaging format. It also provides a candidate list of vehicle parameters to monitor along with how to encode the data for each. There is a pin in the connector that provides power for the scan tool from the vehicle battery, which eliminates the need to connect a scan tool to a power source separately. However, some technicians might still connect the scan tool to an auxiliary power source to protect data in the unusual event that a vehicle experiences a loss of electrical power due to a malfunction. Finally, the OBD-2 standard provides an extensible list of diagnostic trouble codes (DTCs). As a result of this standardization, a single device can query the on-board computer(s) in any vehicle.

The second connector 18 includes a second type of connector interface for securely providing the unique driver profile 28 and electronic information 30 from plural electronic signals from plural individual components 32 of the vehicle 24 to an external device 34, 34', 34" with one or more processors.

Wired Interfaces

In one embodiment, the second connector 18 comprises a wired 18' or a wireless interface 18".

In one embodiment, the wired interface 18' includes a serial port connector or a Universal Serial Bus (USB) connector interface.

A "serial port" is a serial communication physical interface through which information transfers in or out one bit at a time.

A "Universal Serial Bus (USB)" is an industry standard developed in the mid-1990s that defines the cables, connectors and communications protocols used in a bus for connection, communication, and power supply between electronic devices.

However, the present invention is not limited to the connectors described and more, fewer or other wired connector interfaces can be used to practice the invention.

Wireless Interfaces

In one embodiment of the present invention, the wireless interface 18" includes, but are not limited to, a cellular telephone, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home, Zigbee, Bluetooth, Infrared, Industrial, Scientific and Medical (ISM), a Radio Frequency Identifier (RFID) or other long range or short range wireless interfaces may be used to practice the invention.

The wireless cellular telephone interface includes, but is not limited to Code Division Multiple Access (CDMA), Time Division Multiple Access (TDMA), or other wireless technologies and also includes Packet Cellular Network (PCN), Global System for Mobile Communications, (GSM), Generic Packet Radio Services (GPRS), network/Personal Communications Services network (PCS), a Cellular Digital Packet Data (CDPD), Long Term Evolution (LIE), and/or other wireless interfaces.

PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, facsimile, caller ID, Internet access, and e-mail.

SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. As is known in the art, a Packet Cellular Network (PCN) includes various types of packetized cellular data.

Long-Term Evolution (LTE) commonly marketed as Fourth Generation (4G) LTE, is a standard for wireless communication of high-speed data for mobile phones and data terminals. It is based on the Global System for Mobile Communications (GSM)/Enhanced Data rates for GSM Evolution (EDGE) and Universal Mobile Telecommunications System (UMTS)/High Speed Packet Access (HSPA) network technologies, increasing the capacity and speed using a different radio interface together with core network improvements.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide Wireless Link Prioritization (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can also be used to provide WLP.

In one embodiment of the invention, the WiMAX interface includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those communications networks 35 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

IEEE 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference.

Bluetooth (IEEE 802.15.1a) is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. and the IEEE 802.15.1a standard are incorporated herein by reference.

Infra data association (IrDA) is a short-range radio wireless Bluetooth or wireless infrared communications.

Industrial, Scientific and Medical (ISM) are short-range radio wireless communications interfaces operating at 400 MHz, 800 MHz, and 900 Mhz. ISM sensors may be used to provide wireless information to practice the invention.

RFID is an automatic identification method, relying on storing and remotely retrieving data using devices called RFID tags or transponders. An RFID tag is a small object that can be attached to or incorporated into a product, animal, or person. RFID tags contain antennas to enable them to receive and respond to radio-frequency queries from an RFID transceiver. Passive tags require no internal power source, whereas active tags require a power source. RFID sensors and/or RFID tags are used to provide wireless information to practice the invention.

Passive tags are powered by received radiation from a reading device and require no internal source of power; thus, they can be manufactured at very low cost and require no ongoing maintenance as long as they are not removed or physically damaged. Passive tags can only be read by a reader device in close proximity to the tag, which is an advantage in RFID-based in-vehicle location services.

RFID active tags may also be employed for location awareness. Active tags have longer range and can include more sophisticated functionality. In the context of this invention, active tags may be programmed to validate their location from time to time, either by reference to Global Positioning System (GPS) signals using very long integration times, or by interrogation of other RFID tags in their vicinity.

A RFID tag which finds itself in an incorrect or unverified location is programmed to turn itself off, thus avoiding spurious location data being provided to a user; responses to incorrect location may also include emitting a distress signal which can be detected by a reader during building maintenance, or contacting a central location by direct wireless communications or mesh networking employing the multiplicity of companion ID tags, in order to induce maintenance personnel to diagnose and repair the problem with the subject tag.

RFID active tags are also deployed in a mesh network that would allow information to pass from tag to tag. This type of network would allow tag and reader information to be passed from location to location and possibly from floor to floor to move the information to a central location or to the building wall ultimately making it easier to access. Active tag networks have significant functional advantages, but are relatively expensive and maintenance-intensive compared to passive tags.

In one embodiment, of the invention, the wireless interface 18" includes a wireless personal area network (WPAN) interface. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks 35.

In one embodiment, the apparatus 12 communicates with other network devices 34, 34', 34", each with one or more processors, with near field communications (NFC) and/or machine-to-machine (M2M) communications.

"Near field communication (NFC)" is a set of standards for smartphones 34''' and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless connections and wireless networks and more, fewer and/or other wireless interfaces can be used to practice the invention.

Figure 4:
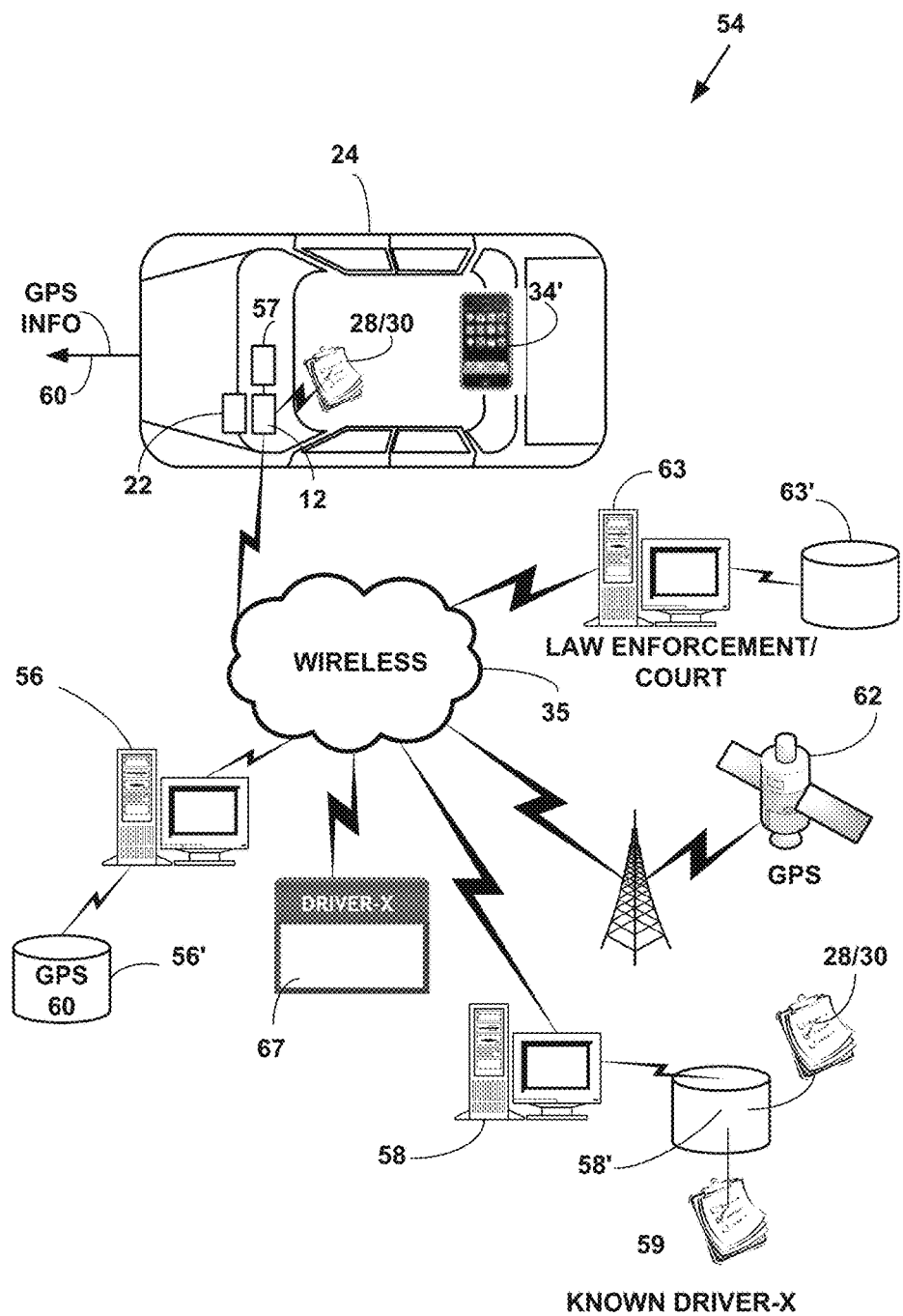
FIG. 4 is a block diagram illustrating transmitting the unique driver profile in real-time.

FIG. 4 is a block diagram 54 illustrating transmitting the unique driver profile 28 in real-time from the apparatus 12.

In one embodiment, the wireless interface 18" securely provides the unique driver profile 28 and electronic information 30 from the plural electronic signals from the plural individual components 32 of the vehicle 24 to an external device 34, 34', 34" in real-time (i.e., with a second or two or less time of an event that occurs, etc.) via a wireless communications network 35.

In such an embodiment, apparatus 12 is in communications with a communications system including plural server network devices 56, 58, two of which are illustrated, each with one or more processors and one or more associated data bases 56', 58' for storing data. In such an embodiment, the activities of the driver 42 of the vehicle 25 can be monitored in real-time.

However, the present invention is not limited to such an embodiment and the present invention can be practiced with and/or without securely transmitting the unique driver profile 28 and electronic information 30 via the wireless interface 18" in real-time.

Non-Transitory Computer Readable Medium

In one embodiment, the non-transitory computer readable medium 40 further comprises a configuration application 53 including a plurality of instructions for causing the one or more processors 38 of the electronic circuit 36 to create the unique driver profile 28 for the driver 42 of the vehicle 24 and for configuring the electronic circuit 36 to accept only selected ones of the plural electronic signals from the plural individual components 32 of the vehicle 24 and from the result of the driver 42 operating the vehicle 24. In such an embodiment, the external devices 34, 34', 34", 34''' also include a configuration application component 53' that communicates with the configuration application 53 with a wired 18' and/or wireless 18" connection via the second connector 18.

In one embodiment, the unique driver profile 28 and/or the electronic information 30 is stored in an encrypted format in the non-transitory computer readable medium. Such encrypted storage protects the data and prevents unauthorized access and/or unauthorized tampering of the data. However, the present invention is not limited to storing the unique driver profile 28 and/or the electronic information 30 in an encrypted format and the unique driver profile 28 and/or the electronic information 30 can be used stored as plaintext data to practice the invention.

However, the present invention is not limited to such an embodiment and the present invention can be practice with and/or without the configuration application 53 and the configuration application components 53'. In such an embodiment, the apparatus 12 is configured during a manufacturing process.

Security and Encryption

Apparatus 12 with wired 18' and/or wireless interfaces 18" of the present invention include one or more of the security and encryptions techniques discussed herein for secure communications and secure storage of data in the non-transitory computer readable medium 40.

The computer readable medium 40 includes security and/or encryption application programs 41. Security and/or encryption programs may also exist in hardware components on the apparatus 12 described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to such security and encryption methods described herein and more, fewer and/or other types of security and encryption methods can be used to practice the invention.

OBD-2 Electronic Circuit

The apparatus 12 further includes an electronic circuit 36 including one or more processors 38 inside the case component 14 connected to the male connector 16, the second connector 18 and the non-transitory computer readable medium 40. The electronic circuit 36 is configured for automatically creating the unique driver profile 28 for the driver 42 of the vehicle 24 from the electronic information 30 received from the plural electronic signals from the plural individual components 32 of the vehicle 24 configured by the driver 42 of the vehicle 24 and received as a result of the driver 42 operating the vehicle 24 and stored in the non-transitory computer readable medium 40.

In one embodiment, the electronic circuit 36 includes an integrated circuit (IC) or monolithic integrated circuit (also referred to as an IC, a chip, or a microchip). An integrated circuit is a set of electronic circuits on one small plate ("chip") of semiconductor material, normally silicon. However, the present invention is not limited to such an embodiment and other types of circuits can be used to practice the invention.

The electronic circuit 36 includes an operating environment for the present invention comprising a processing system with one or more high speed Central Processing Unit(s) ("CPU") 38 or other types of processors 38.

In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU 38. An electrical system represents data bits which cause a resulting transformation or reduction of the electrical signals, and the maintenance of data bits at memory locations in a memory system to thereby reconfigure or otherwise alter the CPU's 38 operation, as well as other processing of signals. The memory locations where data bits are maintained are physical locations that have particular electrical, magnetic, optical, or organic properties corresponding to the data bits.

The data bits may also be maintained on a non-transitory computer readable medium 40 including magnetic disks, optical disks, organic memory, and any other volatile (e.g., Random Access Memory ("RAM")) or non-volatile (e.g., Read-Only Memory ("ROM")) mass storage system readable by the CPU 38.

In one embodiment, the electronic circuit 36 of the apparatus 12 is powered by a power source from the vehicle 24 (e.g., 12 volt, etc.) The power source is obtained from one of the plural receptacles 26 (e.g., pin 16, etc.) in the OBD-2 diagnostic port 22 integral to the vehicle 24.

In another embodiment, the electronic circuit 36 of the apparatus 12 receives a first power source from the vehicle 24. When the apparatus 12 is unplugged from the OBD-2 diagnostic port 22 integral to the vehicle 24, it has no power. To retrieve the unique driver profile 28 and the electronic information 30, the apparatus 12 uses a power source supplied to the second connector 18 from an external device 34, 34', 34", etc.

However, the present invention is not limited to such embodiments and more, fewer and other combinations of internal and/or external power sources can be used to practice the invention.

In another embodiment the electronic circuit 36 of the apparatus 12 is powered by a power source of the second connector (e.g., serial, USB, wireless, etc.).

In another embodiment, the electronic circuit 36 further includes an internal power supply 43 comprising a Direct Current (DC) and/or an Alternating Current (AC) power supply and/or a combination thereof.

The power supply 43 includes an electronic device that supplies electric power to an electrical load. The primary function of a power supply is to convert one form of electrical energy to another and, as a result, power supplies are sometimes referred to as electric power converters. Some power supplies are discrete, stand-alone devices, whereas others are built into larger devices along with their loads. Every power supply must obtain the energy it supplies to its load, as well as any energy it consumes while performing that task, from an energy source. All power supplies have a power input, which connects to the energy source, and a power output that connects to the load. In many power supplies the power input and output consist of electrical connectors.

In one embodiment, the power supply 43 includes a DC power supply. A DC power supply is one that supplies a voltage of fixed polarity (either positive or negative) to its load. Depending on its design, a DC power supply may be powered from a DC source or from an AC source. DC power supplies, include, but are not limited to, batteries, thermocouples, solar cells, capacitors, etc.

A "battery" is a device consisting of one or more electrochemical cells that convert stored chemical energy into electrical energy. In one embodiment, the apparatus 12, includes a battery with life of about two-four weeks to allow for downloading from the apparatus 12. In one embodiment, a primary and a backup battery is used. However, the present invention is not limited to this embodiment and the invention can be practiced without a backup battery.

A "thermocouple" is a temperature-measuring device consisting of two dissimilar conductors that contact each other at one or more spots. It produces a voltage when the temperature of one of the spots differs from the reference temperature at other parts of the circuit.

A "solar cell" (also called a photovoltaic cell) is an electrical device that converts the energy of light directly into electricity by the photovoltaic effect.

A "capacitor" (originally known as a condenser) is a passive two-terminal electrical component used to store energy electrostatically in an electric field. For example, the mechanical motion of the solenoid valve 24, other valves and/or pumps is used to dispense the condiment can be used re-charge the capacitor.

In another embodiment, the power supply 43 includes an AC power supply.

An AC power supply typically takes the voltage from a main power source, (e.g., 110 volt wall socket, etc.) and lowers it to a desired voltage.

In another embodiment, the power supply 43 includes a switched-mode power supply (SNIPS). In an SNIPS, the AC mains input is directly rectified and then filtered to obtain a desired DC voltage. The resulting DC voltage is then switched on and of at a high frequency by electronic switching circuitry, thus producing an AC current that will pass through a high-frequency transformer or inductor. Switching occurs at a very high frequency (e.g., typically 10 kHz to 1 MHz), thereby enabling the use of transformers and filter capacitors that are much smaller, lighter, and less expensive than those found in linear power supplies operating at mains frequency, After the inductor or transformer secondary, the high frequency AC is rectified and filtered to produce the desired DC output voltage. In such an embodiment the power is obtained for the SNIPS from power source on the vehicle 24.

However, the present invention is not limited to the power supplies discussed and other types of internal and/or external power supplies and/or other combinations of AC and DC power can be used to practice the invention.

The apparatus 12 may also include plural other recording and/or detection interfaces 61, including, but not limited to, a temperature, altimeter, barometric pressure, humidity, organic solvent, smoke (e.g., cigarette, cigar, drug (e.g., marijuana, hash, crack cocaine, methamphetamines, etc.), gas detection and/or InfraRed (IR) sensor interfaces 61.

In one embodiment, the plural electronic signals from plural individual components 32 (e.g., mirrors, seats, brakes, accelerator, radio, heating preferences, cooling, preferences, etc.) of the vehicle 24 in those exemplary signals illustrated in Table 1. However, the present invention is not limited to the signals described and more, fewer and other signals can be used to practice the invention. The signals are not described in any particular order and are not required to be assigned to any particular pin 20. In addition, a sixteen pin connection is used with the OBD-2 interface 22. However, the present invention is not limited to sixteen signals and more, fewer or other signals can be used to practice the invention. In addition, more than sixteen signals can be used by using one or more of the plural pins 20 as a "change mode" pin to allow a second, third, fourth set of signals to be obtained and receiving plural signals on an electrical bus internal to the vehicle 24. In addition, one pin 20 can be used to collect plural different signals from one receptacle 26.

TABLE 1

1. A first electronic signal accepted on the electronic circuit 36 including geo-location, altitude and time information including GPS location and time information 60 of a driver 42 of a vehicle.
2. A second electronic signal accepted on the electronic circuit 36 indicating vertical seat position for the driver 42 of the vehicle 24.
3. A third electronic signal accepted on the electronic circuit 36 indicating a rear-view mirror position for the driver 42 of the vehicle 24.
4. A fourth electronic signal accepted on the electronic circuit 36 indicating a left side-view mirror position for the driver 42 of the vehicle 24.
5. A fifth electronic signal accepted on the electronic circuit 36 indicating a right side-view mirror position for the driver 42 of the vehicle 24.

TABLE 1-continued

6. A sixth electronic signal accepted on the electronic circuit 36 indicating a position for a steering wheel for the driver 42 of the vehicle 24.
7. A seventh electronic signal accepted on the electronic circuit 36 indicating a plurality of radio stations set for the driver 42 of the vehicle 24.
8. An eighth electronic signal accepted on the electronic circuit 36 indicating acceleration sequence and acceleration curve information for the driver 42 of the vehicle 24.
9. A ninth electronic signal accepted on the electronic circuit 36 indicating vehicle speed information for the driver 42 of the vehicle 24.
10. A tenth electronic signal accepted on the electronic circuit 36 indicating braking sequence and deceleration information for the driver 42 of the vehicle 24.
11. An eleventh electronic signal accepted on the electronic circuit 36 indicating fuel consumption information for the driver 42 of the vehicle 24.
12. A twelfth electronic signal accepted on the electronic circuit 36 indicating geographic location information 60 for the vehicle 24 as the vehicle 24 travels between one or more different geographic locations.
13. A thirteenth electronic signal accepted on the electronic circuit 36 indicating activation of an airbag for a passenger in a front passenger seat of the vehicle 24.
14. A fourteenth electronic signal accepted on the electronic circuit 36 indicating geofence location information for the vehicle 24.
15. A fifteenth electronic signal accepted on the electronic circuit 36 indicating biometric 45 information for the driver 42 of the vehicle 24.
16. A sixteen electronic signal accepted on the electronic circuit 36 indicating still or video camera 47 information for a passenger compartment 49 of the vehicle 24.
17. A seventeenth electronic signal accepted on the electronic circuit 36 indicating temperature, altimeter, barometric pressure, humidity, cigarette smoke and organic solvent and gas detection for a passenger compartment 49 of the vehicle 24.
18. A eighteenth electronic signal accepted on the electronic circuit 36 indicating heating preferences for a passenger compartment 49 of the vehicle 24.
19. A nineteenth electronic signal accepted on the electronic circuit 36 indicating cooling preferences for a passenger compartment 49 of the vehicle 24.
20. A twentieth electronic signal accepted on the electronic circuit 36 indicating horizontal seat position for the driver 42 of the vehicle 24.

Table 2 illustrates standard pins defined for OBD-2. However, the present invention is not limited to this pin layout and others can be used to practice the invention.

TABLE 2

| Pin Receptacle 26 | Signal | Description |
| --- | --- | --- |
| 2 | J1850 Bus+ | |
| 4 | CGND | GND |
| 5 | SGND | GND |
| 6 | CAN High | J-2284 |
| 7 | ISO 9141-2 K-LINE | Tx/Rx |
| 10 | J1850 Bus– | |
| 14 | CAN Low | J-2284 |
| 15 | ISO 9141-2 L-LINE | Tx/Rx |
| 16 | +12 v | Battery power |

A Controller Area Network (CAN) bus is used in most cars since 2004. The CAN protocol is a popular standard outside of the automotive industry and is making significant in-roads into the OBD-2 market share. By 2008, all vehicles sold in the US were required to implement the CAN bus, thus eliminating the ambiguity of the existing five signaling protocols.

The CAN bus is simply a pair of wires, often twisted around each other, running around the vehicle and terminated at either end of the two-wire network with resistors of 120 Ohms. The only components connected to the CAN bus are the electronic control units (nodes). Other components, such as sensors, motors, light bulbs, switches, etc. are wired only to the electronic control units. Some vehicles have a CAN bus system along side the ISO/KWP2000 system. A vehicle which uses CAN bus for on-board diagnostics can only respond to an OBD-2 request from a tester which uses CAN bus. From model year 2008 vehicle manufacturers must use the OBD protocol specified in ISO 15765, also known as Diagnostics On CAN.

Two wires of CAN bus, CAN-H and CAN-L, will have the same voltage when idle (about 2.5V), or a voltage difference of 2V when a signal is placed on the CAN bus. When a signal is placed on the CAN bus the CAN-H line is at a higher voltage than the CAN-L line. Each electronic control unit have its own CAN identity code, like an address (may respond to several CAN id codes). If an electronic control unit is to communicate to another it will need to know the CAN identity code of the recipient.

A simple check to see if the CAN bus is in use in a vehicle, and accessible via the OBD socket, is to connect a resistance meter across pin 6 and pin 14. Due to the combined resistance of the two termination resistors at 120 Ohms each the overall resistance should be read as 60 Ohms.

OBD-2 provides access to numerous other data from the Engine Control Unit (ECU) and offers a valuable source of information when troubleshooting problems inside a vehicle. The Society of Automotive Engineers (SAE) J1979 standard defines a method for requesting various diagnostic data and a list of standard parameters that are available from the ECU and other devices 32 in the vehicle 24. The various parameters that are available are addressed by parameter identification numbers or Parameter IDentifiers (PIDs), which are defined in SAE J1979, which is incorporated herein by reference.

OBD-2 PIDs (On-board diagnostics Parameter IDs) are codes used to request data from a vehicle, used as a diagnostic tool. SAE standard J/1979 defines many PIDs, but manufacturers also define many more PIDs specific to their vehicles. All light duty vehicles (i.e. less than 8,500 pounds) sold in North America since 1996, as well as medium duty vehicles (i.e. 8,500-14,000 pounds) beginning in 2005, and heavy duty vehicles (i.e. greater than 14,000 pounds) beginning in 2010, were required to support OBD-2 diagnostics, using a standardized data link connector, and a subset of the SAE J/1979 defined PIDs (or SAE J/1939 as applicable for medium/heavy duty vehicles), primarily for state mandated emissions inspections.

Typically, an automotive technician uses PIDs with a scan tool connected to the vehicle's OBD-2 connector. The technician enters the PID The scan tool sends it to the vehicle's controller-area network (CAN)-bus, VPW, PWM, ISO, KWP. (After 2008, CAN only). A device on the bus recognizes the PID as one it is responsible for, and reports the value for that PID to the bus. The scan tool reads the response, and displays it to the technician.

The apparatus 12 uses the CAN bus and OBD-2 PIDs to obtain information from the various components 32 of the vehicle 24.

In one embodiment, the apparatus 12 includes its own new and unique OBD-2 PIDs to practice the invention. However, the present invention is not limited to such an embodiment and the invention can be practice with and/or with new unique OBD-2 PIDs.

In one embodiment, the apparatus 12 further includes a biometric interface 45 connected to the case component 14 and electronic circuit 36 for inputting a user biometric 11 of the driver 42. The biometric interface 45 includes, but is not limited to, a finger print scanner interface and/or an iris eye scanner interface and/or other biometric interface. In such an embodiment, a user biometric 11 accepted from the driver 42 is stored the non-transitory computer readable medium 40 and/or in the unique driver profile 28. However, the present invention is not limited to such an embodiment and the present invention can be practiced with and/or without the biometric interface 45.

In one embodiment, the user biometric 11 includes identification data for the driver includes collecting a driver 42 finger print and/or iris eye scan, a current photo of the driver 42 and a current GPS 60 data point directly from the apparatus 12.

In another embodiment, the driver 42 uses an external device 34, 34', 34" such as a smart phone 34" and/or tablet 34', etc. including configuration application components 53' and including a finger print reader and/or application and/or iris eye scanner and/or application and a camera component to collect the user biometric 11.

In one embodiment, the apparatus 12 further includes a camera interface 47 connected to the case component 14 and electronic circuit 36 for collecting still pictures of the driver 42 of the vehicle 24 or video of the driver 42 of the vehicle 24 as the vehicle 24 is operated. In such an embodiment, the camera interface 47 is also used to collect pictures of configurations of individual components 32 (e.g., seat, mirror, etc.) within a passenger compartment 49 in the vehicle 24. In another embodiment, a camera component of an external device 34, 34', 34" is used to collect still pictures and/or video of the driver 42. The external device 34, 34', 34", communicates with the apparatus 12 via the second connector 18 with a wireless 18" or wired 18' connection to send the still pictures and/or video for storage on the apparatus 12. However, the present invention is not limited to such an embodiment and the present invention can be practiced with and/or without the biometric interface 47.

In one embodiment, the apparatus 12 further comprises a start code interface 51. When a driver biometric 11 is accepted and verified a start enable code is automatically sent from the external device 34, 34', 34" such as a smart phone 34" and/or tablet 34', etc. with configuration application components 53' to the apparatus 12 via a wireless connection 18" (e.g., Bluetooth, etc.) via second connection 18. The configuration application components 53' provide an identifier for the external device 34, 34', 34" and current GPS location information 60 for the external device 34, 34', 34". The apparatus 12, provides current GPS location information 60 of the vehicle 24. Once a start code is sent to the apparatus 12, the external device 34, 34', 34" will remained paired to the vehicle 24 during its operation by the identified driver 42.

In one embodiment, the external device 34, 34', 34" is also used to continuously and periodically request rolling retests (e.g., every 30 minutes, etc.) of the driver 42 via a sound or vibration requiring the driver 42 to place their finger and/or eye on the biometric reader 45 and/or in front of the camera interface 42 to ensure the driver 42 is still driving the vehicle 24.

In one embodiment, the apparatus 12 further comprises a user input code interface 55 for inputting a pre-defined, unique user input code unique to the driver 42 of the vehicle 24. The unique user input code is manually input with a smart phone 34", electronic tablet 34', and/or wearable devices 66-72, via the second connector 18 and the configuration application 53 and configuration application component 53'. In such an embodiment, the apparatus 12 is uniquely configured for a specific driver 42 and re-generated for the driver 42 every time the driver desires to drive the vehicle 24. However, the present invention is not limited to such an embodiment and the present invention can be practiced with and/or without the user input code interface 55.

In one embodiment, the apparatus 12 further comprises a Global Positioning Satellite interface 57 for providing GPS physical geographic location information to include altitude (i.e., 3D position, etc.) 60 of the vehicle 24. In such an embodiment, the apparatus 12 obtains GPS location information 60 from one or more GPS satellites 62 with the second connector 18 via the wireless communications network 35 in real-time. The GPS location information 60 is stored both on the apparatus 12 and in one or more databases (e.g., 56', etc.) associated with one or more server network devices (e.g., 56, etc.) on the wireless communications network 35. If the apparatus 12 cannot communicate with the network 35, the GPS information 60 is stored on the apparatus 12 for later retrieval and download and/or later transmission of the information. However, the present invention is not limited to such an embodiment and the present invention can be practiced with and/or without the GPS interface 57.

The Global Positioning System (GPS) is a space-based global navigation satellite system (GNSS) that provides reliable location and time information in all weather and at all times and anywhere on or near the Earth. A GPS receiver 57 calculates its position by precisely timing signals sent by GPS satellites 62. A GPS receiver 57 uses the messages it receives to determine a transit time of each message and computes a distance to each GPS satellite 62. These distances along with the satellites' locations are used with the possible aid of triangulation, depending on which algorithm is used, to compute a current physical position of the GPS receiver 57 and hence the vehicle 24. This position is then displayed on an external device 34, 34', 34", 56, 58, perhaps with a moving map display (e.g., at a street level, etc.) and/or latitude and longitude and/or elevation and/or speed and/or acceleration information may also be included. Many GPS units also show derived information such as travel direction and speed, calculated from position changes. The GPS coordinates include standard GPS, GPS map, Digital GPS (DGPS) and/or other types of GPS information.

The GPS information 60, which includes geo-location and time stamp information is one of the most important indicators of driving habits associated with a driver 42. Such driving habits are used to confirm the identity, and positively identify the driver 42 of the vehicle 24 by times and places it is driven.

For example, the driver 42 may leave his/her house at 7:30 a.m. every morning to drop his/her children off at a school location and then arrive at a work location by 8:05 a.m. every morning. The driver 42 drives the same route local streets to the school and to the work location. At 4:30 p.m., the driver 42 leaves work and drives to the school location to pick up his/her kids after school. The driver arrives at home by 5:05 p.m. every evening. The driver 42 repeats this behavior every weekday Monday through Friday. On weekends, the driver 42 goes grocery shopping, stops at the dry cleaners and at the gas station. The GPS information 60, including the time stamps and geo-location information is used to create a unique driver profile 28. Although they may be asynchronous events such as an accident, a need to work overtime, after school activities, the driver 42 can be uniquely and positively identified by the daily, routine driving habits and stored in the unique driver profile 28.

The GPS interface 57 is also used for "geo-fencing." A "geo-fence" is a virtual perimeter for a real-world geographic area. A geo-fence is dynamically generated—as in a radius around a store or point location. The geo-fence is also statically define as a predefined set of boundaries, like school zones, neighborhood boundaries, specific addresses. Such geofences allow apparatus 12 to be used to monitor the behavior of criminal offenders such as sexual predators, drug dealers, domestic violence offenders with restraining orders, offenders under house arrest or with an electronic monitoring bracelet.

When the GPS device 57 of a location-based service (LBS) user using apparatus 12 in his/her vehicle 24 enters or exits a geo-fence, the device receives a generated notification. This notification includes information about the location of the vehicle 24. The geofence notice is sent to an external device 34, 34', 34", 56, 68 via a voice, SMS message and/or or an email message.

Geofencing, is used for location services and is used for notification that the apparatus 12 and hence vehicle 24 it is installed is entering and/or leaving desired geofence areas and/or for monitoring of drivers, offenders, etc. Geofencing also allows users of the system to draw zones around places of work, customer's sites and home areas. Thus, geofencing can be used to protect parties who have legally obtained a restraining order against a driver 42 of a vehicle 24 from entering the restraining order zone with the vehicle 24.

In one embodiment, the apparatus 12 safely disables the vehicle 24 and locks it down when vehicle 24 enters a geo-fence. For example, if apparatus 12 was placed in the vehicle 24 of a sex offender, the apparatus 12 will safely turn the vehicle 24 off and report the current geographic to law enforcement when the driver 42 of the vehicle enters all school zones which are protected by geofences.

However, the present invention is not limited to such an embodiment and the present invention can be practiced with and/or without geofencing.

Figure 5:
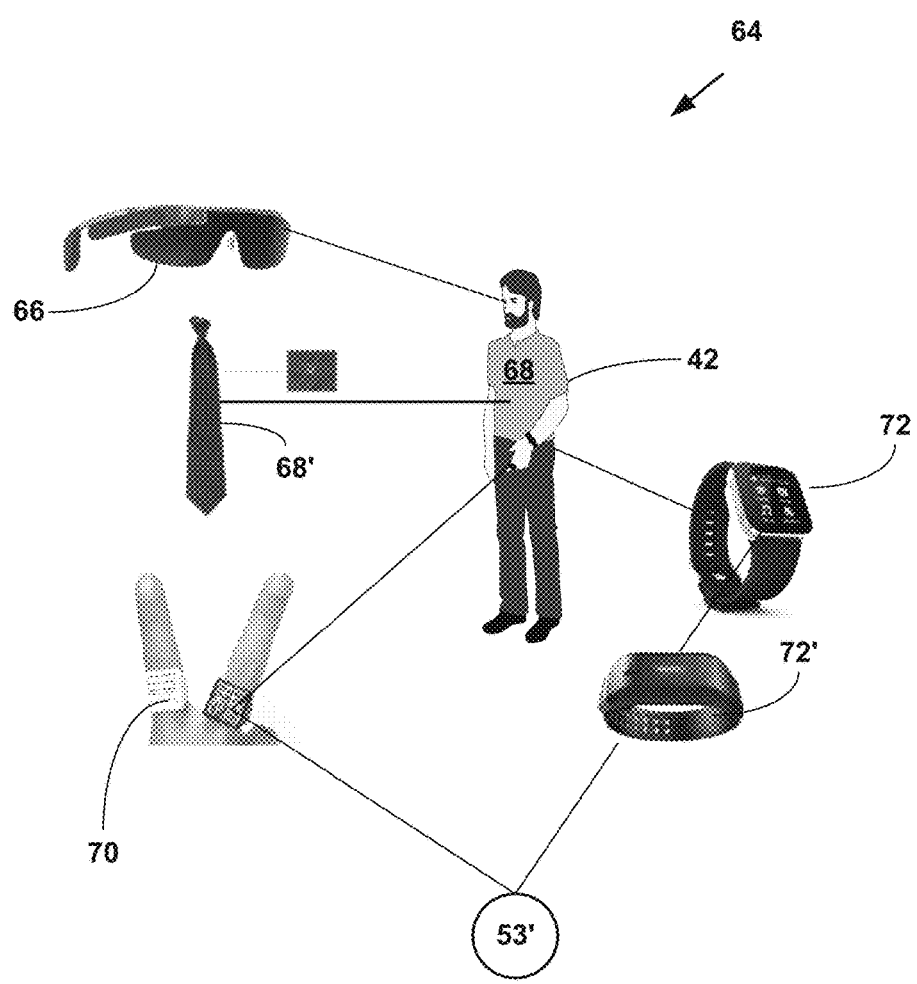
FIG. 5 is a block diagram illustrating wearable network devices.

FIG. 5 is a block diagram 64 illustrating wearable network devices 66-72.

Wearable technology" and/or "wearable devices" are clothing and accessories incorporating computer and advanced electronic technologies. The wearable devices include one or more processors and include, but are not limited to, wearable digital glasses 66, clothing 68 (e.g., smart ties 68', etc.), jewelry 70 (e.g., smart rings, smart earrings, bracelets, etc.) and/or wristware (watches 72, bracelets, 72', etc.). The wearable devices 66-72 include the configuration application component 53'.

The wearable devices 66-72 may also include an ankle monitoring bracelet provided by a court and/or law enforcement agency. The wearable devices 66-72 may also include a tamper proof RFID bracelet 72' that communicates with apparatus 12.

The wearable devices 66-72 communicate with the apparatus 12 via the second connector 18 and the configuration application 53 and configuration application component 53'. However, the present invention is not limited to such embodiments and more, fewer and other types of wearable devices can also be used to practice the invention. The invention can also be practiced without wearable devices 66-72.

Methods for Using the Portable On-Board Diagnostic (OBD) Apparatus to Collect and Store Driving Habits of a Driver FIG. 6 is a flow diagram illustrating a Method 74 for a method for creating a unique driver profile for a vehicle. At Step 76, a first request signal is received on an electronic circuit with one or more processors on a portable on-board diagnostic series 2 (OBD-2) apparatus to create a unique driver profile for a driver of a vehicle including the portable OBD-2 apparatus plugged into an OBD-2 port integral to the vehicle when the vehicle is turned on. At Step 78, plural event signals are received on the electronic circuit from plural individual components of the vehicle uniquely configured by the driver of the vehicle and resulting from the driver operating the vehicle. At Step 80, the electronic circuit creates the unique driver profile. At Step 82, the created unique driver profile and electronic information for the received event plural signals is stored in a non-transitory computer readable medium connected to the electronic circuit. At Step 84, the electronic circuit continually updates the unique driver profile and the electronic information for the received plural event signals in the non-transitory computer readable medium until a second request signal is received on the electronic circuit indicating the vehicle is being turned off.

Method 74 is illustrated with an exemplary embodiment. However, the present invention is not limited to such an exemplary embodiment, and other embodiments can be used to practice the invention.

In such an exemplary embodiment at Step 76, a first request signal is received on an electronic circuit 36 with one or more processors 38 on a portable on-board diagnostic series 2 (OBD-2) apparatus 12 to create a unique driver profile 28 for a driver 42 of a vehicle 24 including the portable OBD-2 apparatus 12 plugged into an OBD-2 port 22 integral to the vehicle 24 when the vehicle 24 is turned on.

In one embodiment, the first request signal includes a unique biometric 11 for the driver 42 of the vehicle 24 to uniquely identify the driver 42 of the vehicle 24. The user biometric 11 includes, but is not limited to, a finger print, an iris eye scan, a DNA sample and/or other user biometric.

It has been determined experimentally that a unique driver profile 28 is similar in uniqueness to a fingerprint 11. No two drivers 42, 42' will generate exactly the same unique driver profile 28 and therefore the unique driver profile 28 can be used to positively identify one driver 42 of a vehicle 24.

In one embodiment, the user biometric 11 is input via a biometric interface 45 attached directly to the apparatus 12.

In another embodiment, the user biometric 11 is input on a network device 34 such as a smart phone 34', tablet 34", etc. and sent to the apparatus 12 with a wireless 18" (e.g., Bluetooth, 802.11x, WiMAX, etc. and/or wired 18' connection to second connection 18.

However, the present invention is not limited to these embodiments and other embodiments, with, and/or without a unique biometric 11 can be used to practice the invention.

In one embodiment, the user biometric 11, includes, but is not limited to, current a finger print or iris eye scan or a photograph of the driver and a current Global Positioning System (GPS) location and timestamp of the driver 42. However, the present invention is not limited to such an embodiment, and more fewer or other types of user biometrics 11 can be used to practice the invention.

At Step 78, plural signals are received on the electronic circuit 36 from plural individual components 32 of the vehicle 24 uniquely configured by the driver 42 of the vehicle 24 and resulting from the driver 42 operating the vehicle 24. In one embodiment, the plural signals, at a minimum, include GPS information 60 including time stamp and geo-location information. Such time and location information comprises a large portion of the information required to determine driving habits to identify the driver 42 of the vehicle 24.

At Step 80, the electronic circuit 36 creates the unique driver profile 28 in the non-transitory computer readable medium 40 connected to the electronic circuit 36. The unique driver profile 28 may be stored in an encrypted and/or a plaintext format.

At Step 82, the created unique driver profile 28 and electronic information 30 for the received plural signals is stored in the non-transitory computer readable medium 40 connected to the electronic circuit 36. The unique driver profile 28 and the electronic information 30 may be stored in an encrypted and/or a plaintext format.

At Step 84, the electronic circuit 36 continually updates the unique driver profile 28 and the electronic information 30 for the received plural signals in the non-transitory computer readable medium 40 until a second request signal is received on the electronic circuit 36 indicating the vehicle 24 is being turned off.

In one embodiment, the created unique driver profile 28 may be collected, stored, and subsequently used for comparison to confirm driver ID or is securely sent in real-time (e.g., every 1, 2, 5 seconds, etc.) from the apparatus 12 to an external network device 34 via the communications network 35. In another embodiment, the unique driver profile 28 is not sent in real-time, instead the unique driver profile 28 is offloaded off the apparatus 12 at a later time with a wired 18' and/or wireless 18" connection via the second connector 18.

FIG. 7 is a flow diagram illustrating a Method 86 for a method for creating a unique driver profile for a vehicle. At Step 88, a second request signal is received on the electronic circuit for the created unique driver profile for the portable OBD-2 apparatus. At Step 90, the created unique driver profile and electronic information from the non-transitory computer readable medium is securely sent via a wired or wireless interface port on a second connector connected to the electronic circuit to a network device with one or more processors via a communications network. At Step 92, a test is conducted on the network device to compare the received created unique driver profile and the electronic information to a stored driver profile for the driver to determine whether the driver or another driver is actually operating the vehicle. If at Step 92, the driver is determined not to be driver of operating the vehicle, at Step 94, the network device sends a third message to another network device with one or more processors indicating another driver may be actually operating the vehicle.

Method 86 is illustrated with an exemplary embodiment. However, the present invention is not limited to such an exemplary embodiment, and other embodiments can be used to practice the invention.

In such an exemplary embodiment at Step 88, a second request signal is received on the electronic circuit 36 for the created unique driver profile 28 for the portable OBD-2 apparatus 12.

In one embodiment, Step 88 is initiated in real-time when the vehicle 24 is being operated by the driver 42. However, the present invention is not limited to this embodiment and other embodiments can also be used to practice the invention.

In one embodiment, Step 88, is also automatically initiated when the OBD-2 apparatus 12 has been un-plugged from the OBD-2 port 22 integral to the vehicle 24. However, the present invention is not limited to this embodiment and other embodiments can also be used to practice the invention.

At Step 90, the created unique driver profile 28 and electronic information 30 from the non-transitory computer readable medium 40 is securely sent with one or more of the security and/or encryption methods described herein via a wired or wireless interface port on a second connector 18 connected to the electronic circuit 36 to a network device 34, 34', 34", 56, 58, 63 with one or more processors via a communications network 35.

At Step 92, a test is conducted on the network device (e.g., 58) to compare the received created unique driver profile 28 and the electronic information 30 to a stored driver profile 59 for the driver 42 to determine whether the driver 42 or another driver 42' is actually operating the vehicle 24.

In one embodiment, the test at Step 92 includes comparing a biometric 11 collected from the driver 42 to a stored biometric 11 for the driver, and/or a picture of the driver 42 to a picture collected from the driver 42 and/or current GPS location information from the apparatus 12 to current GPS location information from an external device 34, 34', 34" used by the driver 42 and paired with apparatus 12 during the start enable code sequence described herein. However, the presenting invention is not limited to such embodiments and other comparisons can be used to practice the invention.

In one embodiment, the test at Step 92 also includes a geofencing test to determine if the vehicle 24 has driven within a prohibited geographical area. However, the present invention is not limited to such an embodiment and other embodiments may be used to practice the invention.

At Step 92, if the driver 42 is determined not to be driver of operating the vehicle 24, at Step 94, the external device 58 sends a message to another network device 34, 34', 34", 56, 58, 63, 66-72 (e.g., law enforcement, court, etc.) with one or more processors indicating another driver 42' may be actually operating the vehicle 24.

Method 86 allows drivers 42 whose driving privileges and/or driving territories may have been restricted by a court of law to be closely monitored and thereby significantly reduce the restricted driver's ability to drive if prohibited, to drive into prohibited territories and/or have another driver 42' operate his/her vehicle 24.

FIG. 8 is a flow diagram illustrating a Method 96 for a method for creating a unique driver profile for a vehicle. At Step 98, a first message including plural driver information is received on a network device with one or more processors via a communications network from an identified driver of a vehicle. At Step 100, the network device creates a driver profile for the identified driver from the plural driver information. At Step 102, the network device stores in a database associated with the network device the created driver profile as a known driver profile for the identified driver. At Step 104, second message is received on the network device from an electronic circuit with one or more processors on a portable on-board diagnostic series 2 (OBD-2) apparatus including a unique driver profile created for a current driver of the vehicle including the portable OBD-2 apparatus plugged into an OBD-2 port integral to the vehicle. At Step 106, the network device conducts a test to compare the received unique driver profile to the known driver profile for the identified driver to determine whether the identified driver or another driver is actually operating the vehicle. If at Step 106, the identified driver is not actually operating the vehicle, at Step 108, a second message is sent from the network device to another network device with one or more processors indicating another driver may be actually operating the vehicle instead of the identified driver.

Method 96 is illustrated with an exemplary embodiment. However, the present invention is not limited to such an exemplary embodiment, and other embodiments can be used to practice the invention.

In such an exemplary embodiment at Step 98, a first message including a plural driver information is received on a network device 56, 58, 63 with one or more processors via a communications network 35 from an identified driver 42 of a vehicle 24.

In one embodiment, the first message includes a unique biometric 11 to identify the driver 42 of the vehicle 24. However, the present invention is not limited to this embodiment and other embodiments can be used to practice the invention.

In one embodiment, the driver, courts, or interested/supervising parties 42 of the vehicle 24 uses a graphical network interface such as a web-page 67 via the communications network 35 to enter driver information. In another embodiment, the driver 42 uses the configuration application component 53' from an external device 34, 34', 34", 66-72. However, the present invention is not limited to such an embodiment, other interfaces can be used to enter driver information and to practice the invention.

At Step 100, the network device 56, 58, 63 creates a driver profile 28' for the identified driver 42 from the plural driver information.

In one embodiment, the preliminary driver profile 28' is created from home, work, and other frequented addresses, expected routes of travel (e.g., local streets, freeways, school zone, etc.), time of day, day of week, time stamp and geo-location information, geofencing information, times of travel (e.g., 7:30 until 8:30 am and again at 4:30 pm to 5:30 p.m., etc. and/or based on the court order/allowed driving times, etc.). However, the present invention is not limited to the plural driver information described and more, fewer or other plural driver information can be used to practice the invention.

In another embodiment, the driver 42 of a vehicle 24 creates the preliminary driver profile 28' by wearing the tamper proof RFID bracelet 72' that communicates with the apparatus 12. The RFID bracelet 72' is similar to ankle bracelets provided by courts for criminal offenders to monitor their activities. In such an embodiment, the driver 42 wears the RFID bracelet 72' for a pre-determined time period (e.g., 1 week, 2 weeks, a month, etc.). The RFID bracelet 72' communicates with the apparatus 12 with a wireless connection. The unique driver profile 28 is created for the driver 42 to be used as a data set to ensure the driver 42 is actually the driver that is operating the vehicle 24 at any time and at any location. After the initialization period, the RFID bracelet 72' need not be worn and the driver 42 can be monitored and identified by his/her current driving habits.

At Step 102, the network device 56, 58, 63 stores in a database 56, 58, 63' associated with the network device 56, 58, 63 the created driver profile 28' as a known driver profile 28' for the identified driver 42. The database may also include a non-transitory computer readable medium such as a hard drive, flash drive, etc. and may be internal and/or external to network device 56, 58, 63.

At Step 104, second message is received on the network device 56, 58, 63 from an electronic circuit 36 with one or more processors on a portable on-board diagnostic series 2 (OBD-2) apparatus 12 including a unique driver profile 28 for a current driver 42 of the vehicle 24 including the portable OBD-2 apparatus 12 plugged into an OBD-2 port 22 integral to the vehicle 24.

The apparatus 12 can also create a non-restricted driver 42' profile that will allow a spouse, partner, friend, relative and/or child to freely drive the vehicle 24. This also prevents the desired driver 42 of the vehicle 24 from being falsely identified as one of such parties who is allowed to freely drive at any time, to any location, etc.

At Step 106, the network device 56, 58, 63 conducts a test to compare the received unique driver profile 28 to the known driver profile 28' for the identified driver 42 to determine whether the identified driver 42 or another driver 42' is actually operating the vehicle 24.

In one embodiment, the test at Step 106 includes comparing a biometric 11 collected from the driver 42 to a stored biometric 11 for the driver, and/or a picture of the driver 42 to a picture collected from the driver 42 and/or current GPS location information from the apparatus 12 to current GPS location information from an external device 34, 34', 34" used by the driver 42 and paired with apparatus 12 during the start enable code sequence described herein. However, the presenting invention is not limited to such embodiments and other comparisons can be used to practice the invention.

If at Step 108, the identified driver 42 is not actually operating the vehicle 24, at Step 110, a second message is sent from the network device 56, 58, 63 to another network device 34, 34', 34", 56, 58, 63, 66-72 with one or more processors indicating another driver 42' may be actually operating the vehicle 24 instead of the identified driver 42. As was described earlier, the apparatus 12 also creates unique driver profiles for non-desired drivers 42' (e.g., spouse, etc.) that is used to positively identify another driver 42' of the vehicle other than the desired driver 42.

FIG. 9 is a flow diagram illustrating a Method 110 for a method for creating a unique driver profile for a vehicle. At Step 112, a network device with one or more processors securely receives in real-time plural fourth messages including a unique biometric to identify the driver of the vehicle from the electronic circuit on the portable OBD-2 apparatus via a communications network. At Step 114, the network device securely receives in real-time plural fifth messages from the electronic circuit on the portable OBD-2 apparatus including a plural new driver profiles for the identified driver of the vehicle. At Step 116, the network device continuously in real-time creates an updated driver profile for the identified driver from the plural fifth messages. At Step 118, network device stores in real-time in a database associated with the network device the created updated driver profile as a known driver profile for the identified driver. The known driver profile is created over a pre-determined period of time from a pre-determined number of fifth messages to dynamically and uniquely a plurality of driving behaviors of the identified driver of the vehicle.

Method 110 is illustrated with an exemplary embodiment. However, the present invention is not limited to such an exemplary embodiment, and other embodiments can be used to practice the invention.

In such an exemplary embodiment at Step 112, a network device 56, 58, 63 with one or more processors receives in real-time plural fourth messages including a unique biometric 11 to identify the driver 42 of the vehicle 24 from the electronic circuit 36 on the portable OBD-2 apparatus 12 via a communications network 35.

At Step 114, the network device 56, 58, 63 receives in real-time plural fifth messages from the electronic circuit 36 on the portable OBD-2 apparatus 12 including a plural new driver profiles for the identified driver 42 of the vehicle 24.

At Step 116, the network device 56, 58, 63 continuously in real-time creates an updated driver profile 28' for the identified driver 42 from the plural fifth messages.

At Step 118, network device 56, 58, 63 stores in real-time in a database 56', 58'. 63' associated with the network device 56, 58, 63 the created updated driver profile 28' as a known driver profile 28' for the identified driver 42. The known driver profile 28' is created over a pre-determined period of time (e.g., one month, etc.) from a pre-determined number of fifth messages (e.g., about 100 to 10,000, etc.) to dynamically and uniquely record driving behaviors of the identified driver 42 of the vehicle 24.

Method 110 creates an "average" and/or "typical" driver profile for the identified driver 42. This average and/or typical driver profile prevents the identified driver 42 from being falsely reported as having another driver 42' actually driving the vehicle 24 of the identified driver 42. For example, one first day the identified driver 42 may drive really slow and cautious because the identified driver is taking his/her children to school and must obey traffic laws for a school zone. On a second day the identifier driver may drive more aggressively because he/she is driving in freeway traffic and must obey traffic laws for driving on a freeway. Such driving behaviors are "averaged" out over time to determine a driver profile 28 that correctly and uniquely identifies the identifier driver 42.

In one embodiment, the method and system described herein is used to uniquely identify a driver 42 of a vehicle 24 based on a created unique driver profile 28 including individual driver acceleration and deceleration sequences or curves. The created unique driver profile 28 can be used to prove another person other than a desired driver 42 drove the vehicle 24. For example, the desired driver 42 was 6'3" tall, 250 pounds and set the seat and mirrors to reflect a person that size and pushed hard on the accelerator pedal and brake pedal and drove at an average speed of 45 mph. This male driver 42 frequently visits golf courses and sporting goods stores. However, the created unique driver profile 28 included information for a person (e.g., a woman) 5'1" tall, 100 pounds with the seat and mirrors to reflect a person that size and pushed softly on the accelerator pedal and brake pedal and drove at an average speed of 30 mph. This female driver 42 frequently visits hair and nail salons and clothing stores. The reverse situation can also be tracked by the apparatus 12 where the vehicle of the 5'1" woman was driven by the 6'3" man, etc. which would initiate an event because the 6'3" man drove in a different manner than the 5'1" woman and visa-versa.

Such driver activities are typically done subconsciously without thinking and as the result of well ingrained driving habits that can and are used to uniquely and positively identify a desired driver 42. The apparatus 12 can also be used to prove a desired driver 42 did drive the vehicle 24. Such proof is valuable in the event of an accident, a situation in which a driver 42 has a suspended license, a driver 42 is desired to be followed by law enforcement and/of a private investigator, etc.

FIG. 10 is a flow diagram illustrating a Method 120 for a method for creating a unique driver profile for a vehicle. At Step 122, the network device periodically sends via the communications network to the electronic circuit on the portable OBD-2 apparatus a confirmation request message requesting the current driver of the vehicle send new current driver information including a new driver biometric and current a finger print or iris eye scan or a photograph of the driver, and/or a driver identification code and a current Global Positioning System (GPS) location of the driver. At Step 124, the network device receives via the communications network from the electronic circuit on the portable OBD-2 apparatus a confirmation response message including the new current driver information. At Step 126, a test is conducted on the network device to compare the received new current driver information to the known driver profile for the identified driver to determine whether the identified driver or another driver is actually operating the vehicle. If at Step 126, the identified driver is not actually operating the vehicle, at Step 128 a sixth message is sent from the network device to another network device with one or more processors indicating another driver may be actually operating the vehicle instead of the identified driver.

Method 120 is illustrated with an exemplary embodiment. However, the present invention is not limited to such an exemplary embodiment, and other embodiments can be used to practice the invention.

In such an exemplary embodiment at Step 122, the network device 56, 58, 63 periodically sends via the communications network 35 to the electronic circuit 36 on the portable OBD-2 apparatus 12 a confirmation request message requesting the current driver 42 of the vehicle 24 send new current driver information 28, 30.

In one embodiment, the new current driver information 28, 30 includes a new driver biometric 11 and current a finger print or iris eye scan, a photograph of the driver, a driver user code, and a current Global Positioning System (GPS) location of the driver 42. However, the present invention is not limited to such an embodiment, and more fewer or other current driver information 28, 30 can be used to practice the invention.

At Step 124, the network device 56, 58, 63 receives via the communications network 35 from the electronic circuit 36 on the portable OBD-2 apparatus 12 a confirmation response message including the new current driver information 28, 30.

At Step 126, a test is conducted on the network device 56, 58, 63 to compare the received new current driver information 28, 30 to the known driver profile 28/30 for the identified driver 42 to determine whether the identified driver 42 or another driver 42' is actually operating the vehicle 24.

In one embodiment, the test at Step 126 includes comparing a biometric 11 collected from the driver 42 to a stored biometric 11 for the driver, and/or a picture of the driver 42 to a picture collected from the driver 42 and/or current GPS location information from the apparatus 12 to current GPS location information from an external device 34, 34', 34" used by the driver 42 and paired with apparatus 12 during the start enable code sequence described herein. However, the presenting invention is not limited to such embodiments and other comparisons can be used to practice the invention.

If at Step 126, the identified driver 42 is not actually operating the vehicle 24, at Step 128 a sixth message is sent from the network device 56, 58, 63 to another network device 56, 58, 63 with one or more processors indicating another driver 42' may be actually operating the vehicle 24 instead of the identified driver 42.

FIG. 11 is a flow diagram illustrating a Method 130 for a method for creating a unique driver profile for a vehicle. At Step 132, a first identification message including plural current driver information is received on a portable on-board diagnostic series 2 (OBD-2) apparatus with one or more processors during operation of a vehicle with a first driver. At Step 134, the portable on-board diagnostic series 2 (OBD-2) apparatus conducts a test to compare the current driver information to a driver profile for an identified driver previously created and store on the OBD-2 apparatus to determine whether the identified driver or another driver is actually operating the vehicle. If at Step 134, the first driver and not identified driver is not actually operating the vehicle, at Step 136, a second message is sent in real-time from the portable on-board diagnostic series 2 (OBD-2) apparatus to another network device with one or more processors via communications network indicating another driver may be actually operating the vehicle instead of the identified driver.

Method 130 is illustrated with an exemplary embodiment. However, the present invention is not limited to such an exemplary embodiment, and other embodiments can be used to practice the invention.

In such an exemplary embodiment at Step 132, a first message including plural driver information is received on a portable on-board diagnostic series 2 (OBD-2) apparatus 12 with one or more processors via a communications network 35 from a driver 42 of a vehicle 24.

At Step 134, the portable OBD-2 apparatus 12 conducts a test to compare the received driver information to a known driver profile for the driver previously created and stored on the portable on-board diagnostic series 2 (OBD-2) apparatus to determine whether an identified driver or another driver is actually operating the vehicle.

If at Step 134, the identified driver 42 is not actually operating the vehicle, at Step 136, a second message is sent from the portable OBD-2 apparatus 12 to another network device 34, 34', 34", 56, 58, 63, with one or more processors via a communications network 35 indicating another driver 42' may be actually operating the vehicle instead of the identified driver 42.

Method 130 allows the portable OBD-2 apparatus 12 to determine in real-time that a driver of a vehicle is not a desired and previously identified driver 42. If the OBD-2 apparatus 12 cannot establish communications The unique driver profile 28 and driving habits of a driver collected and stored on apparatus 12 can be used as "Habit evidence" in the United States in a court of law.

Identifying a Driver of a Vehicle without the OBD-2 Apparatus

FIG. 12 is a flow diagram illustrating a Method 138 for a method for creating a unique driver profile for a vehicle. At Step 140, a first request signal is received on an application on a network device with one or more processors to create a current driver profile for a driver of a vehicle that has been turned on. At Step 142, plural event signals are received on the application on the network device resulting from the driver operating the vehicle. At Step 144, the application on network device creates the current driver profile. At Step 146, the application stores the current driver profile in a non-transitory computer readable medium on the network device. At Step 148, the application on the network device continuously compares the created current driver profile to a stored known driver profile. At Step 150, the application on the network device continuously updates the created current driver profile and the electronic information in the non-transitory computer readable medium until a second request signal is received on the network device indicating the vehicle is being turned off.

Method 138 is illustrated with an exemplary embodiment. However, the present invention is not limited to such an exemplary embodiment, and other embodiments can be used to practice the invention.

In such an exemplary embodiment at Step 140, a first request signal is received on application 53' on a network device with one or more processors 34, 34', 34", 66-72, to create a current driver profile 28 for a driver 42 of a vehicle 24 that has been turned on. The network device includes a computer, 34 smart phone 34', tablet 34", wearable device 66-72, etc.

At Step 142, plural event signals are received on the application 53' on the network device 34, 34', 34", 66-72, resulting from the driver 42 operating the vehicle 24.

In an exemplary embodiment, the network device 34, 34', 34", 66-72 is not in communications with the OBD-2 apparatus 12. In such an embodiment, driving habits of the driver 42 are recorded using integral components of the network device 34, 34', 34", 66-72 such as a GPS component (including time stamp and geolocation, etc.), accelerometer component, camera component, biometric component, voice recorder component, etc. and/or non-integral components such as external interfaces and/or sensors and/or devices (e.g., temperature, smoke, chemical, biometric, etc.) that can be plugged into the network device 34, 34', 34", 66-72 and/or a communications interface for communicating with the vehicle 24 directly (e.g., Bluetooth, InfraRed, 802.11x, etc.) to collect data about the driving habits of the driver 42 of the vehicle 24.

In another embodiment, the network device 34, 34', 34", 66-72 is in communications with the OBD-2 apparatus 123 plugging into the vehicle 24.

However, the present invention is not limited to these components and/or embodiments and other components and/or embodiments may be used to practice the invention.

At Step 144, the application 53' on the network device 34, 34', 34", 66-72 creates a current driver profile 28.

At Step 146, the application 53' on the network device 34, 34', 34", 66-72 stores the created current driver profile 28 in a non-transitory computer readable medium on the network device 34, 34', 34", 66-72.

At Step 148, the application 53' on the network device 34, 34', 34", 66-72, continuously compares the created current driver profile 28 to a stored driver profile 28.

In one embodiment, the application 53' on the network device 34, 34', 34", 66-72 continually sends the created driver profile 28 to another external network device 56, 58, 63, etc. to verify an identity of the driver 42 of the vehicle 24. In such an embodiment, the comparison is done externally in real-time via the communications network 35. Methods 6-11 are executed in connection with Step 148.

In another embodiment, the application 53' on the network device 34, 34', 34", 66-72 locally processes and compares a current created driver profile 28 to a previously created and stored driver profile 28' to determine an identity of the driver 42 of the vehicle 24 in real-time.

If there is a discrepancy between an identity of the driver 42 when comparing the current created driver profile 28 and previously created and stored driver profile 28', the application 53' on the network device 34, 34', 34", 66-72 queries in real-time the current driver 42 of the vehicle 24 for additional identifying information such as another fingerprint, another photograph, another voice print, etc. as was described above in FIGS. 10 and 11 for the OBD-2 apparatus 12.

However, the present invention is not limited to these embodiments and other embodiments may be used to practice the invention.

At Step 150 the application 53' on the network device 34, 34', 34", 66-72 continuously updates the current crated driver profile 28 in the non-transitory computer readable medium until a second request signal is received on the application 53' network device 34, 34', 34", 66-72 indicating the vehicle 24 is being turned off.

In one embodiment, the application 53' on network device 34, 34', 34", 66-72 sends the created current driver profile 28 to another network device 56, 58, 63, etc. in real-time via the communications network 35.

In another embodiment, the application 53' on network device 34, 34', 34", 66-72 stores the created current driver profile 28 in the non-transitory computer readable medium on the network device 34, 34', 34", 66-72 for later retrieval and/or to provide an updated driver profile 28' to further uniquely identify the driving habits of the driver 42 of the vehicle 24.

However, the present invention is not limited to these embodiments and other embodiments may be used to practice the invention.

Described herein is a method and system for automatically creating a unique driver profile for a vehicle. The unique driver profile is created with a portable on-board diagnostic series 2 (OBD-2) apparatus, and/or on linked network devices (e.g., smart phones, tablets, etc.) and GPS including altitude data based on driving habits of a driver. The apparatus is configured for accepting plural electronic signals from plural individual components of the vehicle uniquely configured by the driver of the vehicle and from the result of the driver operating the vehicle and creating the unique driver profile from the accepted plural signals. The unique driver profile is sent in real-time from the apparatus to a network device to check the identity of the driver. The unique driver profile helps confirm an identity of the driver of the vehicle for civil and criminal legal matters, for personal matters (family, new drivers, etc.) and/or for other types of matters.

The (OBD-2) apparatus, and/or on linked and/or on stand alone network devices (e.g., smart phones, tablets, etc.) are programmed to collect, store and subsequently compare generated driver profiles or driver data to confirm driver identification both onboard and offboard the vehicle.

The methods and system described herein can also be practiced without the OBD-2 apparatus 12. In such embodiments, a network device (e.g., smart phones, tablets, wearable devices, etc.) is used instead of the OBD-2 apparatus to directly collect, store and send driving habit information for a driver of a vehicle in a unique driver profile.

The unique driver profile helps confirm an identity of the driver of the vehicle for civil legal matters, for criminal legal matters, for personal matters (family, new drivers, etc.) and/or for other types of matters in which the unique driving habits of a driver of vehicle are used to positively identify a current driver of a vehicle.

It should be understood that the architecture, programs, processes, methods and systems described herein are not related or limited to any particular type of computer or network system (hardware or software), unless indicated otherwise. Various types of general purpose and/or specialized computer systems and/or processing systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. A method for creating a unique driver profile for a driver of a vehicle, comprising:
    receiving a first request signal on an application in a vehicle with one or more processors and a non-transitory computer readable medium via a vehicle network in the vehicle from a plurality of individual components on the vehicle to create a unique driver profile for a first driver of a vehicle that has been turned on;
    receiving a first set of plurality of electronic signals on the application on the vehicle resulting from the first driver configuring physical positions of selected ones of the plurality of individual components of the vehicle in a passenger compartment of the vehicle when operating the vehicle, the physical positions of selected ones of the plurality of individual components of the vehicle in the passenger compartment comprising physical positions of seats, mirrors, steering wheel, heating, cooling, radio, and physical position information from sensors, motors, light bulbs, switches, electronic control units, bus interfaces or network interfaces from the passenger compartment of the vehicle;
    receiving a second set of plurality of electronic signals on the application on the vehicle resulting from the first driver driving the vehicle;
    creating from the application on the vehicle the unique driver profile including electronic information received from the first and second set of plurality of electronic signals from the plurality of individual components of the vehicle uniquely configured by the first driver of the vehicle and received as the result of the driver operating the vehicle, the unique drive profile including unique driving habits and unique habits and behavior of the first driver;
    storing from the application on the vehicle the created unique driver profile in the non-transitory computer readable medium on the vehicle for the first driver;
    continuously updating on the application on the vehicle the created unique driver profile in the non-transitory computer readable medium until a second request signal is received on the vehicle indicating the vehicle is being turned off; and
    storing from the application on the vehicle the created unique driver profile as a known driver profile for the first driver the vehicle.

2. The method of claim 1 further comprising:
    conducting a second test on the application on the vehicle to compare the received second known driver profile to the stored known driver profile to determine whether the second driver authorized to drive the vehicle, and if not,
    sending from the application on the vehicle to one or more other components of the vehicle one or more signals to turn off the vehicle to prevent the second driver as an unauthorized driver from operating the vehicle.

3. The method of claim 1 further comprising:
    receiving a first set of plurality of electronic signals on the application on the vehicle resulting from the second driver configuring physical positions of selected ones of the plurality of individual components of the vehicle in the passenger compartment of the vehicle when operating the vehicle;
    receiving a second set of plurality of electronic signals on the application on the vehicle resulting from the second driver driving the vehicle;
    creating from the application on the vehicle the second unique driver profile including electronic information received from the first and second set of plurality of electronic signals from the plurality of individual components of the vehicle uniquely configured by the second driver of the vehicle and received as the result of the second driver operating the vehicle, the unique drive profile including unique driving habits and unique habits and behavior of the second driver;
    storing from the application on the vehicle the created second unique driver profile in the non-transitory computer readable medium on the vehicle for the second driver;
    continuously comparing on the application on the vehicle the created second current driver profile to the stored known driver profile for the first driver;
    conducting a third test on the application on the vehicle to compare the received second known driver profile to the stored known driver profile to determine whether the second driver authorized is impaired based on information in the stored known driver profile, and if so
    sending from the application on the vehicle to one or more other components of the vehicle one or more signals to turn off the vehicle to prevent the second driver as an unauthorized driver from further operating the vehicle.

4. The method of claim 1 further comprising:
    sending periodically to a network device with one or more processor for a current driver of the vehicle via the communications network from the application on the vehicle a confirmation request message requesting the current driver of the vehicle send new current driver information including a new driver biometric a unique biometric signal for the driver of the vehicle received from an identification means including: (1) a voice identification means comprising collecting a current voice recording of the driver; or (2) a visual identification means comprising: collecting one or more of a current finger print, iris eye scan, or a photograph collected from the driver; and (3) a current Global Positioning System (GPS) location of the driver
    receiving a response message from the network device via the communications network from the network including new current driver information including the new driver biometric signal;
    conducting a test on the on the application on the vehicle to compare the received new current driver information to the known driver profile for the identified driver to determine whether the identified driver or another driver is actually operating the vehicle by comparing with the voice identification means the current voice recording from the received new driver biometric signal of the driver to a previously stored voice recording for the driver or comparing one or more of a current finger print, iris eye scan, or a photograph from the received new driver biometric signal of the driver to one or more of a previous finger print, iris eye scan or photograph of the driver with the visual identification means, and
    if the identified driver is not actually operating the vehicle, sending a first alert message from application on the vehicle via the communications network to another network device with one or more processors indicating another driver may be actually operating the vehicle instead of the identified driver.

5. The method of claim 4 further comprising
conducting a second test on the application on the vehicle to compare the received new current driver information to the known driver profile for the identified driver to determine whether the identified driver or another driver is actually operating the vehicle, and if the identified driver is not actually operating the vehicle,
sending a second alert message from the application on the vehicle the network device via the communications network indicating another driver may be actually operating the vehicle instead of the identified driver.

6. The method of claim 1 further comprising:
receiving a new request signal on the application fin the vehicle that the vehicle that has been turned on by a second driver;

receiving on the application on the vehicle from a driver application on a network device with one or more processor for the second driver a second known driver profile for the second driver;

conducting a test on the application on the vehicle to compare the received second known driver profile to the stored known driver profile to determine whether the second driver is the first driver including comparing the configured physical positions of selected ones of the plurality of individual components in the received second driver profile with the stored known driver profile, and if not, positively identifying the second driver as another driver, thereby preventing the second driver as being falsely identified as the first driver; and storing from the application on the vehicle the received second known driver profile in the non-transitory computer readable medium.

* * * * *

UNITED STATES PATENT AND TRADEMARK OFFICE
CERTIFICATE OF CORRECTION

PATENT NO. : 9,988,058 B2
APPLICATION NO. : 15/236030
DATED : June 5, 2018
INVENTOR(S) : Brian K. Phillips Page 1 of 1

It is certified that error appears in the above-identified patent and that said Letters Patent is hereby corrected as shown below:

In the Specification

Column 3    Line 5     The word "The" should be "There" (first occurrence)

Column 4    Line 58    The word "re-coverts" should be "re-convert"

Column 7    Line 22    The words "does not" should be "does not include"

Column 19   Line 1     The words "solenoid value 24" should be "solenoid valve"

Column 19   Line 2     The words "is used to dispense the condiment" should be deleted Column 23   Line 63    The words "Although they" should be "Although there"

Signed and Sealed this
Thirty-first Day of March, 2020

Andrei Iancu
*Director of the United States Patent and Trademark Office*